(12) United States Patent
Lawrence

(10) Patent No.: US 10,356,417 B2
(45) Date of Patent: Jul. 16, 2019

(54) METHOD AND SYSTEM OF VIDEO CODING USING PROJECTED MOTION VECTORS

(71) Applicant: INTEL CORPORATION, Santa Clara, CA (US)

(72) Inventor: Sean J. Lawrence, Bangalore (IN)

(73) Assignee: Intel Corporation, Santa Clara, CA (US)

(*) Notice: Subject to any disclaimer, the term of this patent is extended or adjusted under 35 U.S.C. 154(b) by 143 days.

(21) Appl. No.: 15/281,476

(22) Filed: Sep. 30, 2016

(65) Prior Publication Data

US 2018/0098073 A1  Apr. 5, 2018

(51) Int. Cl.
*H04N 19/139* (2014.01)
*H04N 19/182* (2014.01)
*H04N 19/597* (2014.01)
*H04N 19/176* (2014.01)
*H04N 19/52* (2014.01)
*H04N 19/57* (2014.01)

(52) U.S. Cl.
CPC ......... *H04N 19/139* (2014.11); *H04N 19/176* (2014.11); *H04N 19/182* (2014.11); *H04N 19/52* (2014.11); *H04N 19/57* (2014.11); *H04N 19/597* (2014.11)

(58) Field of Classification Search
None
See application file for complete search history.

(56) References Cited

U.S. PATENT DOCUMENTS

| | | | | |
|---|---|---|---|---|
| 7,894,525 | B2* | 2/2011 | Piehl | G06T 7/223 348/452 |
| 9,271,678 | B2* | 3/2016 | Liao | A61B 5/7207 |
| 2004/0095999 | A1* | 5/2004 | Piehl | H04N 19/597 375/240.16 |
| 2005/0135482 | A1* | 6/2005 | Nair | H04N 5/145 375/240.16 |
| 2005/0179801 | A1* | 8/2005 | Miwa | G03B 15/00 348/335 |
| 2009/0086103 | A1 | 4/2009 | Nair | |
| 2013/0101017 | A1* | 4/2013 | De Vleeschauwer | A63F 13/12 375/240.02 |
| 2015/0103915 | A1* | 4/2015 | Xu | H04N 19/593 375/240.16 |
| 2015/0110190 | A1 | 4/2015 | Sartor et al. | |
| 2015/0138380 | A1* | 5/2015 | Tsubaki | H04N 5/144 348/208.1 |
| 2015/0304681 | A1 | 10/2015 | An et al. | |
| 2015/0341664 | A1 | 11/2015 | Chen et al. | |
| 2016/0029041 | A1 | 1/2016 | Maeda et al. | |
| 2016/0286200 | A1* | 9/2016 | Chang | H04N 13/271 |
| 2017/0098299 | A1* | 4/2017 | Liu | G06K 9/00577 |
| 2017/0102467 | A1* | 4/2017 | Nielsen | G01S 19/47 |
| 2017/0213388 | A1* | 7/2017 | Margolis | H04N 19/139 |

OTHER PUBLICATIONS

International Search Report and Written Opinion for International Patent Application No. PCT/US17/47438, dated Nov. 29, 2017.
Bross, B.et al., "Fast decoder side motion vector derivation for inter frame video coding", Picture Coding Symposium, 2009 (PCS 2009), May 6-8, 2009, Chicago, IL, USA.

* cited by examiner

*Primary Examiner* — Mohammad J Rahman
(74) *Attorney, Agent, or Firm* — Green, Howard & Mughal LLP.

(57) ABSTRACT

Techniques related to video coding perform by using projected motion vectors.

25 Claims, 14 Drawing Sheets

```
┌─────────────────────────────────────────────┐
│ RECEIVE PIXEL DATA OF MULTIPLE IMAGES OF    │
│ THE SAME SCENE AND CAPTURED FROM MULTIPLE   │
│ DIFFERENT CAMERA POSITIONS AT DIFFERENT     │
│ ANGLES RELATIVE TO THE SCENE 502            │
└─────────────────────────────────────────────┘
                      ↓
┌─────────────────────────────────────────────┐
│ DETERMINE SOURCE MOTION VECTORS OF IMAGES   │
│ OF AT LEAST TWO CAMERA POSITIONS OF THE     │
│ MULTIPLE CAMERA POSITIONS AND BY USING A    │
│ PREDICTION LOOP OF A CODER 504              │
└─────────────────────────────────────────────┘
                      ↓
┌─────────────────────────────────────────────┐
│ PROJECT THE SOURCE MOTION VECTORS TO FORM   │
│ A PROJECTION MOTION VECTOR ON AT LEAST ONE  │
│ IMAGE OF THE MULTIPLE CAMERA POSITIONS TO   │
│ BE USED TO ENCODE THE AT LEAST ONE IMAGE 506│
└─────────────────────────────────────────────┘
```

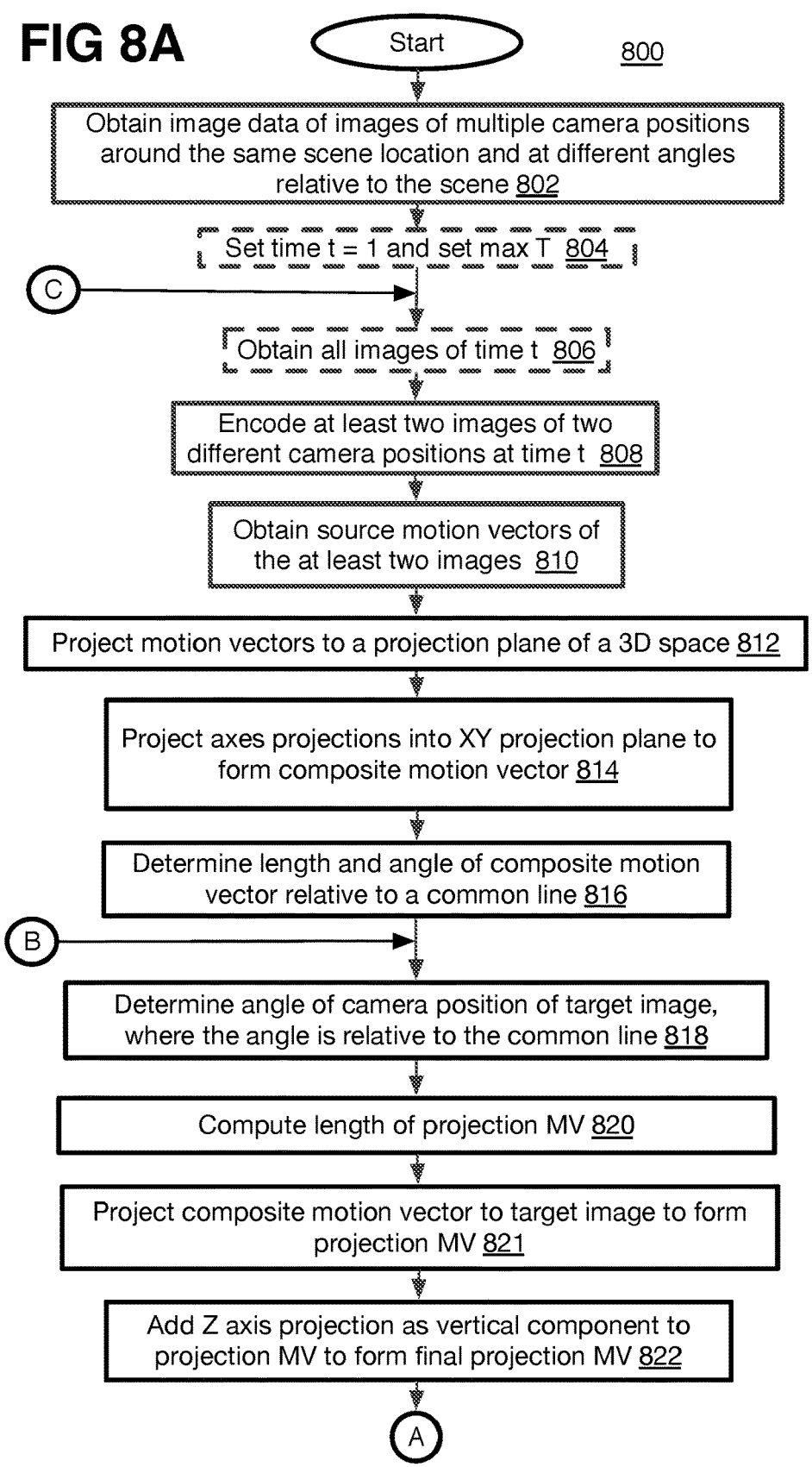

METHOD AND SYSTEM OF VIDEO CODING USING PROJECTED MOTION VECTORS

BACKGROUND

Due to ever increasing video resolutions, and rising expectations for high quality video images, a high demand exists for efficient image data compression of video while performance is limited for coding with existing video coding standards such as H.264 or H.265/HEVC (High Efficiency Video Coding) standard, VP# standards such as VP9, and so forth. The aforementioned standards use expanded forms of traditional approaches to address the insufficient compression and quality problem, but often the results are still insufficient.

The conventional video coding processes use inter-prediction at an encoder to reduce temporal (frame-to-frame) redundancy. This is accomplished by first performing motion estimation to determine where the same or similar image data has moved between a reference frame and a current frame being analyzed. The frames are often divided into blocks, and the motion is represented by a motion vector that indicates where a block has moved from frame-to-frame. Motion compensation is then performed to apply the motion vector to construct a prediction block for a current frame to be reconstructed. The difference in image data of a block between the prediction and real (original or actual) data is called the residual data and is compressed and encoded together with the motion vectors.

The motion estimation is conventionally performed as a search on a reference frame for one or more blocks that match a block being analyzed on the current frame. These brute searches, however, can be very computationally large causing unnecessary delay in the coding process. Thus, in order to reduce the number of searches that must be performed, a spatial technique may be applied that computes a motion vector for a current block by using some combination of the previously computed motion vectors of neighbor blocks in the same frame as the current frame being analyzed. This is still computationally heavy and causes delays in known coding systems.

Adding to these difficulties, when compressing video for transmission in a three-dimensional video system recording a scene with multiple cameras, such as at an athletic event, the system treats each camera video sequence separately and computes motion vectors for each camera recording the scene. Such an encoding process multiplies the computations needed to perform the coding of the motion vectors causing further delay.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 5 is a flow chart of a method of video coding using projected motion vectors in accordance with the implementations herein;

FIGS. 8A-8B is a detailed flow chart of a method of video coding using projected motion vectors in accordance with the implementations herein;

DETAILED DESCRIPTION

Figure 1:
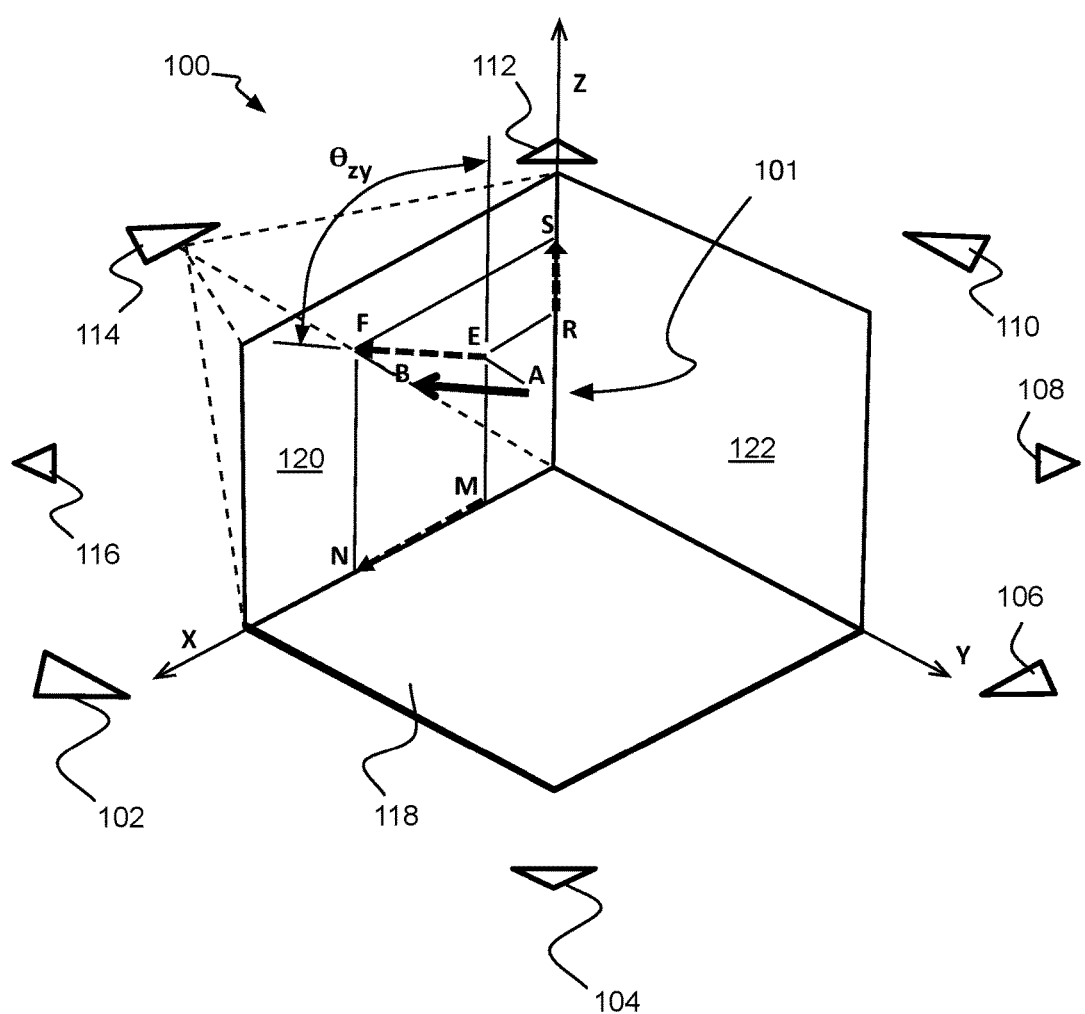
FIG. 1 is a schematic diagram showing a three-dimensional space with a three-dimensional motion vector projected to a surface of an image formed by a camera at one camera position of multiple camera positions around a recorded scene in accordance with the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE)

devices such as multi-camera 3D systems with encoders and decoders at set top boxes, smart phones, televisions, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods are described below related to video coding using projected motion vectors.

Video encoding includes a decoding loop that determines predicted image data in the form of prediction blocks to reconstruct frames. The difference between the predicted block and the actual (or real or original) block is a residual, and the residual is compressed and transmitted to a decoder rather than the full actual block values. To determine the data of the prediction block, the predictions are calculated from either intra prediction that only uses data from blocks on the same frame (spatial prediction) to construct a current block, or inter-prediction that uses blocks from one or more reference frames (temporal prediction). Both of these, intra and inter prediction, may have more than one different mode used to compute candidate prediction block data. A prediction mode selector then selects a best prediction mode among the candidates, which is typically the prediction block with the image data closest to that of an actual block or otherwise with the lowest bit cost.

Inter-prediction includes motion estimation to determine where the same or similar image data has moved between a reference frame and a current frame being analyzed. The motion is represented by a motion vector that indicates where a block has moved from frame-to-frame. Motion compensation is then performed to apply the motion vector to construct the prediction block for a current frame to be a candidate to determine the final residual. The motion estimation may be performed by brute searching of matching blocks or by using previously determined motion vectors of spatial neighbor blocks on the same frame. As mentioned, the computational load can be large for either technique causing delays in the coding process and consuming unnecessarily large portions of the processor(s) computing capacity.

Also as mentioned, systems with multiple video cameras exist that record the same scene, such as at an athletic event, from multiple different views to create a three-dimensional viewing experience. These systems may generate a three-dimensional (3D) space for the recorded scene. Once a scene is generated in three-dimensions, the scene can be rotated so that a user can observe the scene and objects in the scene from multiple different perspectives whether for entertainment or more practical reasons. Often, the video streams from each camera is collected at one or more encoders, and the video streams are then compressed and transmitted to other devices to perform the three-dimensional computations to generate the 3D space. In order to transmit the video data from the multiple cameras or encoder(s), current solutions treat each camera stream as a separate stream before encoding or compression and transmission to a decoder. With this process, full motion estimation is performed for each video stream to determine motion vectors for each image from the multiple cameras recording the same scene. Such a process ignores redundant information from image to image of the same scene thereby unnecessarily causing high computational loads due to all of the motion vector computations, and in turn delay in transmission and that could result in noticeable pauses in the display of the images at the decoder. Alternative methods combine the frames of the different video streams captured at the same time into a larger resolution format with frames arranged side-by-side within a single large frame to use the spatial or temporal compression optimizations of existing compression schemes but does nothing to reduce the amount of motion vectors that are computed for a set of images taken of the same scene from different camera positions around the scene.

To resolve these issues, a method and system are provided that can reduce the computational load to compute motion vectors, and in turn, the time to code the images for three-dimensional camera systems. Specifically, when multiple cameras are recording the same scene from different angles and including motion of moving objects within this scene from time period to time period (where each time period has overlapping views of the scene), redundancies across the different camera views may be used so that the motion vectors from a reduced set of camera views (a subset of all of the camera views available) can be used to determine the motion vectors on the remaining camera views. Thus, motion vectors for objects in the video streams of the reduced set of cameras may be translated to other camera view video streams if the spatial separation between the cameras is known. This may be performed by a combination of geometric projections of the motion vector of the reduced set of camera views onto the desired view. Determining the motion vectors by geometric projection will result in reduced encode or compression time for the camera views to which this is applied and/or free-up more processing capacity to process other tasks.

For accurate systems, projection motion vectors (short for motion vectors generated by projection) may be provided directly for performance of motion compensation thereby skipping motion estimation computations and searches entirely or substantially for the block of image data associated with the projection motion vector. Otherwise, coarse systems that use the proposed method may be used to at least approximately identify the location of the matching block on a reference frame to minimize the search area during motion estimation to generate a motion vector to be used for motion compensation. A prediction based on a projection motion vector by either of these operations may be a candidate prediction for prediction mode selection among all inter and intra prediction candidates. Alternatively, when a projection motion vector is formed, an over-ride mode may be used where normal prediction mode selection may be omitted and inter-prediction is selected as the final prediction mode based on the projection motion vector. When the projection motion vector directly received for motion compensation is the basis of the finally selected prediction mode, the projection motion vector is compressed and placed in the bitstream for transmission to a decoder as the motion vector to be used for decoding. Any of these uses for the projection motion vector may significantly reduce the computations and in turn delay attributed to the generation of the motion vectors.

Referring to FIG. 1 to explain the motion vector projection, a 3D space 100 is shown with axes X, Y, and Z where Z is height, and surrounded by any number of cameras at different camera positions. It will be understood that the axes are labeled for differentiation from each other as are the directions horizontal and vertical. Thus, the labels and directions could be switched unless the context indicates otherwise. In the present example, camera positions 102 to 116 numbered evenly are used, and where the positions used here are uniformly spaced at 45 degree intervals around a scene 101. This may include a 0° position (102) at the X axis, and continuing counter-clockwise, a 45° position (104), a 90° position (106), a 135° position (108), and a 180° position (110). Also from the 0° position 102 continuing clockwise, a −45° position (116), a −90° position (114), and a −135° position (112) may be used and the camera position 110 also may be considered a −180° position. The camera position angle (or camera angle or camanglex) may be considered an angle CamAnglex from the 0 degree direction of the X axis. It will be understood that more or less camera positions may be present, and the spacing may not be uniform. The camera positions also may be equidistant from a center of the 3D space. A real world motion vector AB is shown in the 3D space 100 and represents the movement of one or more objects between point A and point B, and from frame to frame, in a video sequence being recorded from the camera positions 102 to 116. Point A of motion vector AB may represent the position of an object of a scene in a current frame being analyzed, and point B may represent the position of the object in a previous frame being used as a reference frame, but could be a reference frame in other temporal relationships relative to the current frame depending on the coding standard being used and other factors. There could also be more than one reference frame. The 3D space is formed over an xy projection plane or base 118 at z=0. A simple example is provided here where the cameras, or camera positions, 102 to 116 are held in a single same plane, or more precisely the optical axis for each camera position extends in the same plane, and at a height z=K which is some constant K above the xy projection plane 118 and that is parallel to the projection plane 118. The camera plane could be at the xy projection plane when K=0.

The 3D space 100 also is shown with two planes 120 and 122 that each may represent a 2D surface, image, view, display, frame, or picture (all terms used interchangeably herein unless noted otherwise) captured by a respective camera. Here, plane 120 represents the xz plane and an image from camera (or camera position) −90° (114), and plane 122 represents the yz plane and an image from camera (or camera position) 180° (110).

The cameras at positions 110 and 114 view the motion vector AB as a 2D projection onto its own 2D plane 122 and 120 respectively corresponding to the view or frame (or sensor) of the camera. Thus, the projection can be reversed when 2D source motion vectors are generated for the frame during encoding, and those source motion vectors can be projected into the 3D space 100 to form a 3D composite motion vector at position AB without first generating a complete 3D space typically used to form virtual views to show a rotation of an object in the 3D space for example. The 3D composite motion vector formed from this simplified projection can then be projected to other planes (or frames) of other cameras that do not have corresponding motion vectors yet, thereby at least eliminating the need for some, if not all, of the operations at the motion estimation stage of the coding process for these other frames.

For instance, 3D space 100 shows the projection of motion vector (MV) AB onto surface 120 (xz plane) as MV EF (shown in dashed line) with the direction of MV EF being at an angle $\theta_{yz}$ between the yz plane and the motion vector EF. The projections here are perpendicular projections where projection lines AE and BF are perpendicular to the xz plane and MV EF for example. The projections, however, could actually be made along line-of-sight lines from the focal point of the camera, but at great distances (such as when recording an athletic event or other entertainment to an audience), the differences are considered to be negligible. The MV EF starts (at its lowest point here) at a current image (versus a reference image) and at a height of z=Ht above the xy projection plane (here distance EM on image 120), where the height of the camera plane K does not always equal Ht.

Then, the x and z components of the projected MV EF also can be determined by projecting the points E and F to the X axis to form a component MN and to the Z axis to form a component RS using projection lines perpendicular to the X and Z axes as shown. Thus, the angle of MV EF to the yz plane may be computed as:

$$\theta_{yz}=\tan^{-1}(NM/RS) \quad (1)$$

Figure 2:
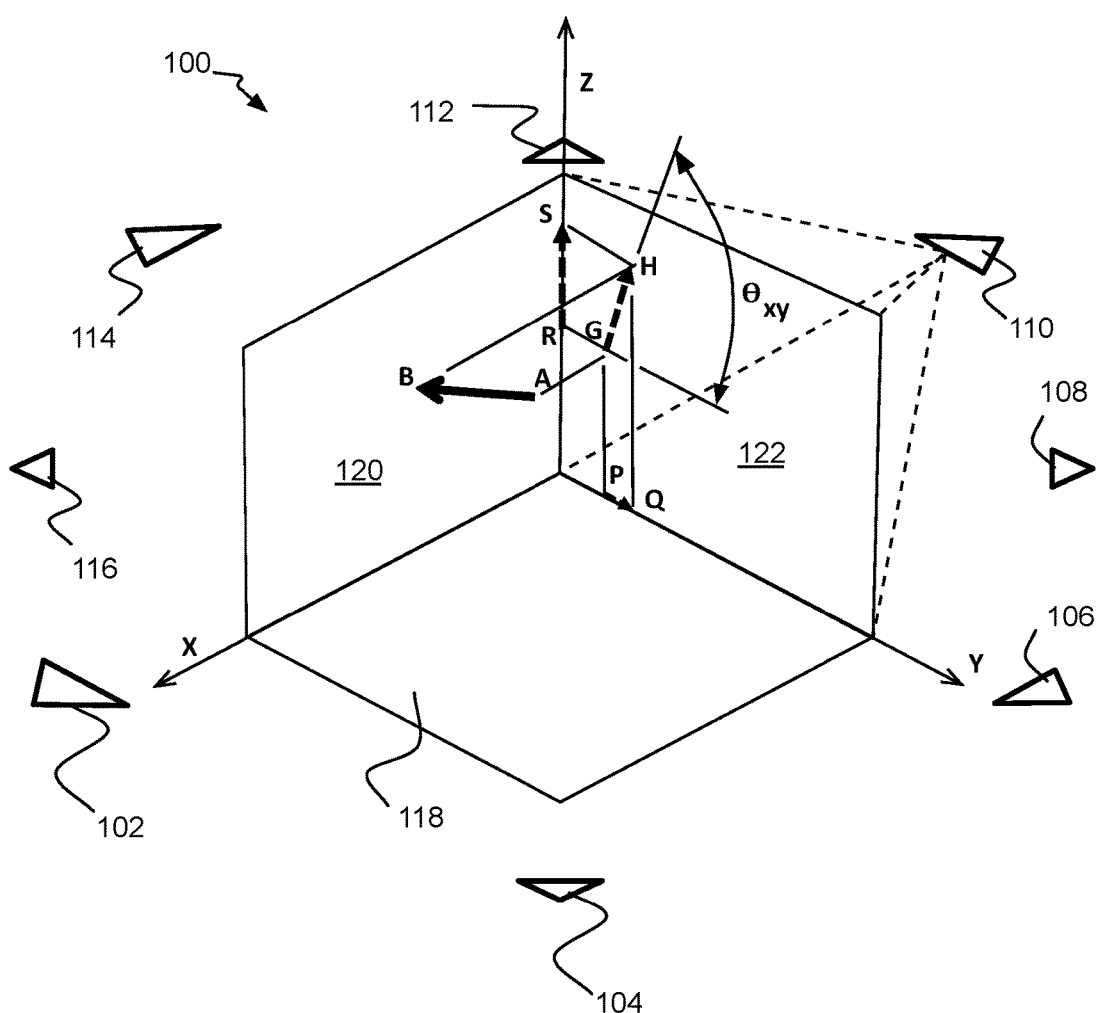
FIG. 2 is a schematic diagram showing the three-dimensional space with the three-dimensional motion vector being projected to the surface of another image formed by a camera at another camera position of the multiple camera positions around the recorded scene in accordance with the implementations herein.

The x and z components MN and RS of MV EF also are the x and z components of the MV AB. Referring to FIG. 2, a similar projection process can be applied to any of the other views. Here, using 3D space 100 again, this time the system projects the 3D motion vector AB onto view or surface (or yz plane) 122 of camera position 110. In this case, perpendicular projection lines BH and AG form a projected MV GH (shown in dashed line) with its lower end G also a height Ht from the xy projection plane shown by distance GP. The y and z component projection of GH then form the same height motion vector component RS along the z axis and a PQ horizontal motion vector component along the Y axis. Once determined, the direction of MV GH can be described as an angle $\theta_{xy}$ between the xy (or projection) plane 118 and MV GH as:

$$\theta_{xy}=\tan^{-1}(RS/PQ) \quad (2)$$

to show the direction of MV GH.

Figure 3:
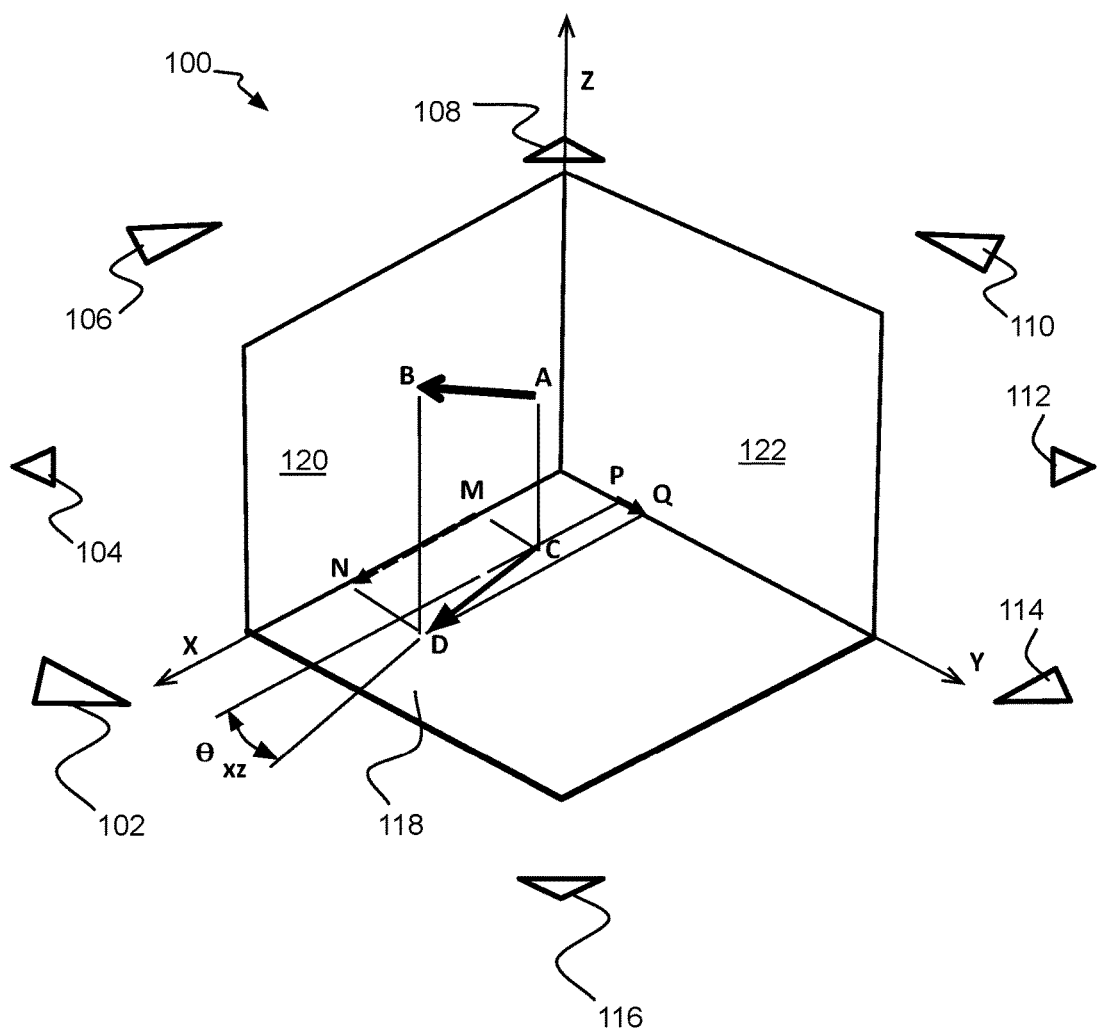
FIG. 3 is a schematic diagram showing the three-dimensional space with the three-dimensional motion vector being projected to a projection plane perpendicular to the images of FIGS. 1 and 2 in accordance with the implementations herein.

Referring to FIG. 3, once the horizontal component MVs MN and PQ are projected to the x and y axes, these MVs become components used to form a composite motion vector CD on the xy plane 118 and at angle $\theta_{xz}$ from the xz plane for example. The composite motion vector CD then can be projected to any camera view and with at least one end at the start height of the motion vector at z=Ht when Ht does not equal 0. The θ angles used in FIGS. 1-3 simply provide the direction of the relevant motion vector and are not necessarily limited to reference to a particular plane.

Figure 4:
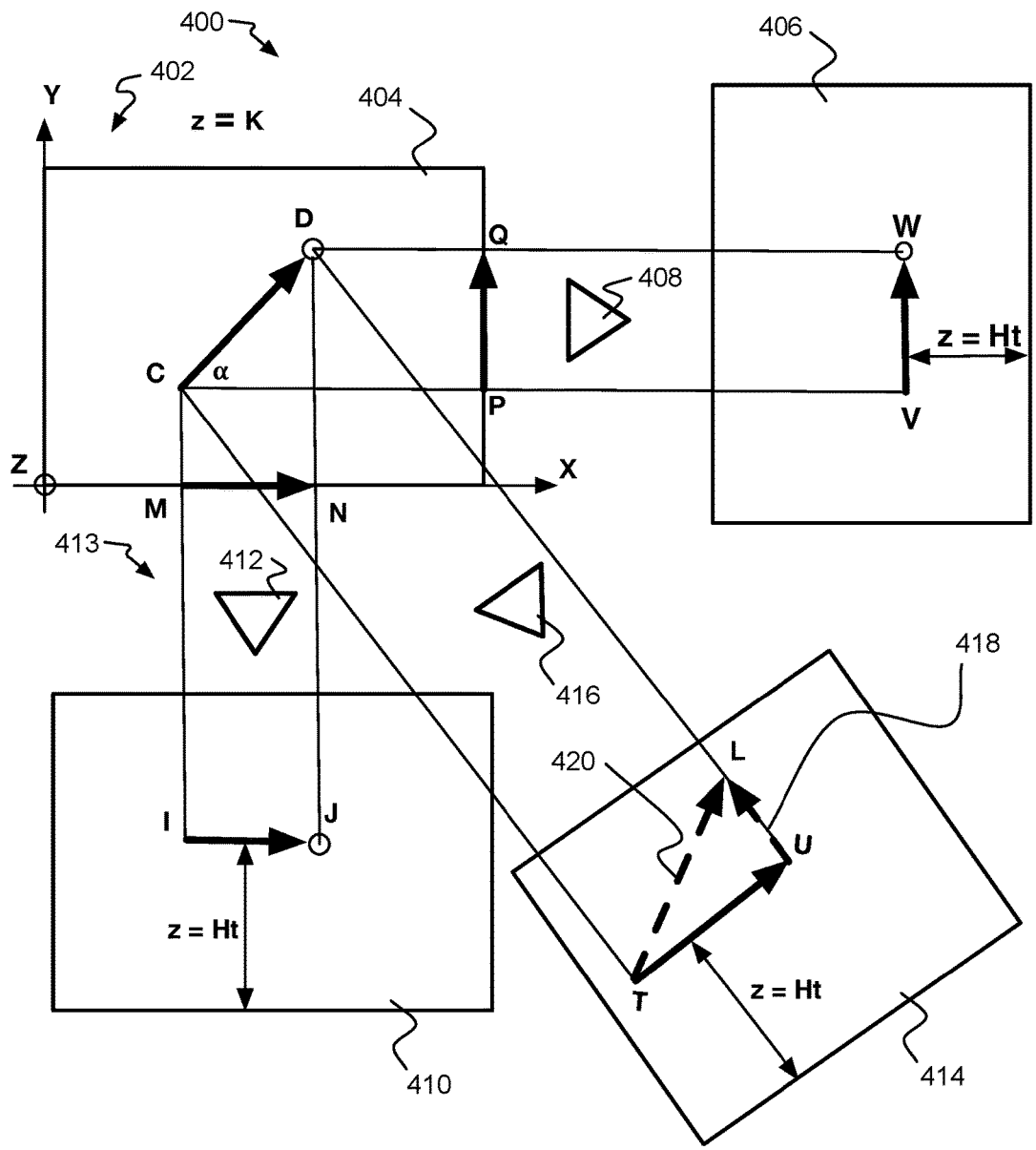
FIG. 4 is a schematic diagram showing a top view of the three-dimensional space with a projection of motion vector components from two elevational image views to form a composite motion vector in the three-dimensional space, and the projection of the composite motion vector to a third elevational image view in accordance with the implementations herein.

Referring to FIG. 4, a motion vector projection space 400 includes a three-dimensional space 402 similar to 3D space 100 and with X, Y, and Z axes shown in top view and looking down on an xy projection plane 404 at z=0. The camera positions here are the same as those in space 100 at a height z=K above the xy projection plane 404. When two source motion vectors are generated for two images from two different camera positions around the same scene, it is possible to determine the corresponding motion vector in any of the other different camera views. In other words, a real 3D object moving at motion vector AB as shown in FIGS. 1-3 is recorded. Two of the images are encoded to generate source motion vectors during inter-prediction. By reversing the examples of FIGS. 1-3, the two source motion vectors are MVs EF and GH, and for projection space 400, two source motion vectors are IJ and VW. These are called source motion vectors since these motion vectors are to be projected to ultimately form a projection motion vector TU or TL on a third image.

More particularly, an image 406 is formed from a camera at a 0° camera position 408 and which is shown in an elevational sideview 2D image or frame of the 3D space 402. The image 406 may be coded at an encoder generating a motion vector VW. The motion vector VW is at height z=Ht where Ht is the height above the XY projection plane to the start or current frame end of the motion vector VW. When Ht=0 the XY projection plane and the source MV VW are at the same height. Also, while VW extends horizontally in image 406, it may extend in any direction. In that case, the horizontal component of VW would be projected to the XY projection plane. In the present case for VW, the height component of the vector is 0. Another 2D image 410 is a sideview of the 3D space 402 and formed by a −90° camera position 412 in the same horizontal plane 413 as the other camera positions and at height z=K from the XY projection plane. The image 410 also was coded and the coding generated a motion vector IJ also at height z=Ht from the start or current frame end of the MV IJ. IJ also does not have a vertical component for this example but certainly could have.

Generally, with the two source motion vectors IJ and VW generated by encoding from two different camera positions 412 and 408 respectively, the motion vectors IJ and VW may be projected into the 3D space (or onto the xy projection plane 404 or parallel plane shown) forming x and y component motion vectors MN and PQ respectively. When the start height Ht of the MVs IJ and VW does not equal 0, this projection is a vertical projection (the distance Ht) to the XY projection plane. These two MVs can then be used to form the composite MV CD which provides the horizontal component of the final projection motion vector on a target image.

The horizontal positions of the ends of the composite MV CD can be projected to a third target image 414 of a different target camera position 416 to form the horizontal ends of a projection motion vector TU. With the length of CD, an included angle α between CD and the X axis, and the target camera position angle (CamAnglex) between the optical axis of the target camera position 416 and the X axis, the length of the projection motion vector TU can be determined on the target image 414. It will be understood that another axis or common line could be used instead of the X axis. The motion vector TU then may be placed at height z=Ht which is the same as the height of the source motion vectors IJ and VW.

While the source MVs IJ and VW are horizontal, these motion vectors very well could include a vertical component resulting in a motion vector that extends diagonally in the elevational images 406 and 410 shown. In this case, the MV TU may be a horizontal component of a final projection motion vector TL (420) (in dashed line). A vertical component UL (418) is then added to projection MV TU to form the final projection MV TL (420). The vertical component UL should be the same as the motion vector height on source MVs IJ and VW and can simply be obtained from the data of one of those motion vectors and added to the projection MV TU when appropriate.

With this arrangement, it does not matter where the three camera positions 408, 412, and 416 are located relative to the x-axis. As long as the positions are known, the two source motion vectors obtained from prediction coding can be used to project a motion vector onto a third image of a different camera position. More details are provided below with processes 500, 800, and 1000.

Referring to FIG. 5, an example process 500 is arranged in accordance with at least some implementations of the present disclosure. In general, process 500 may provide a computer-implemented method of video coding using projected motion vectors as mentioned above. In the illustrated implementation, process 500 may include one or more operations, functions or actions as illustrated by one or more of operations 502 to 506 numbered evenly. By way of non-limiting example, process 500 may be described herein with reference to operations discussed with respect to any of the figures herein, and may be discussed with regard to example systems 600, 700 or 1100 discussed below as well.

The process 500 may comprise "receive pixel data of multiple images of the same scene and captured from multiple different camera positions at different angles relative to the scene" 502. At least three camera positions forming three images of the same scene may be available, two for forming a composite motion vector to be projected to the third image. Otherwise, there is no limit to the number of angular camera positions, and the camera positions may be uniform or other intervals around a scene to be recorded, such as every 45 degrees around the area to be recorded. By an example herein, the camera positions are all on the same horizontal plane around the scene and may be the same distance from the center of the scene (or 3D space) but this need not always be so. Also, by one example, each camera position has a camera for video recording a moving scene, but a single camera could be moved to multiple camera positions for recording an image from different angles one at a time when the scene is substantially fixed over time. Also, the pixel data may have been pre-processed sufficiently for encoding, and the frames (or images) may be partitioned into one or more prediction block sizes where the motion vectors are to be used to determine the motion of individual blocks.

The process 500 also may comprise "determine source motion vectors of images of at least two camera positions of the multiple camera positions and by using a prediction loop of a coder" 504. Thus, the image captured from two or more camera positions may be provided to an encoder with a decoder loop with prediction mode capabilities to perform inter-prediction. Thus, the encoder may generate one or more reference frames for a current image being analyzed, and then may perform inter-prediction to find matching blocks on the reference frame that match a block of image data on the current image to establish a motion vector. When inter-prediction is selected as the prediction mode for a block, the motion vector used for prediction then may be used as a source motion vector for projection. It will be understood that the source motion vectors are formed by each camera position (or camera) using its own reference frame in its own perspective (or angle form the x axis) except that the reference frames for all of the images also must be from the same or sufficiently same time period. The details are explained below.

Once the two or more source motion vectors are obtained, the process 500 may include "project the source motion vectors to form a projection motion vector on at least one image of the multiple camera positions to be used to encode the at least one image" 506. By one example form, the source motion vectors are first used to determine at least one composite motion vector on a projection plane. This is accomplished by projecting the source motion vectors of the images of the at least two camera positions to a common 3D space at least defined by X, Y, Z axes to represent the scene that was recorded by the images. The source motion vectors are projected perpendicular from the image each is disposed and onto the projection plane that is perpendicular or otherwise oblique to the images of the camera position as in FIGS. 1-4. The projection plane may be the XY projection plane and may be at or parallel to the plane forming the camera position optical axes. When the height (z) of the motion vector is different than the height of the xy plane forming the 3D space, the source motion vectors may be considered to be projected vertically as well as horizontally to the XY projection plane first (forming MVs MN and PQ for example in FIG. 4) before being projected within the XY projection plane as x and y component vectors to form the composite MV. For systems such as HEVC that provide alternative block arrangements for a single image, the source motion vectors from different images with either the same (or substantially close to the same) overlapping starting or ending points (i.e. the overlap is at least the same smallest block of image data supported by the encoder such as 4×4 pixels or other minimal block sizes) are considered corresponding motion vectors of the same image pixel data or same block of image data to form a single composite motion vector on the projection plane. Thus, alternative projection motion vectors may be formed from alternative source motion vectors and provided to the encoder.

This operation also then may include projecting the at least one composite motion vector to the at least one image (or target image) of the multiple different camera positions to form a projection motion vector for that target image. The projection of the ends of the composite MV set the horizontal location of the projection MV on the image. An equation may be applied using the angle of the composite motion vector relative to a common line or axis, such as the X axis, the angle (CamAnglex) of the camera position relative to the common line and the length of the composite motion vector to compute the length of the projection motion vector. By one example form, the length of the projection motion vector may be the length of the composite motion vector multiplied by the sine of the difference between the composite motion vector angle and the angle of the camera position as recited in equation (5) below, and while the camera position angles are measure from 0 to +/−180° from the 0° direction of the X axis as explained with 3D space 100. The motion vector is placed at a height z=Ht on the target image. Since the composite motion vector is formed in a horizontal plane, the composite motion vector may be considered a horizontal component projection that when projected to another image, will be combined with a vertical component, if it exists, to form a final projection motion vector. The result is that each image has a projection or source motion vector that corresponds to the same image data, and indicates the motion of a block of image data between a reference frame and the current frame.

Thereafter, when an accurate system is used, the encoder may omit motion estimation for the block of image data that has a projected motion vector. By other systems, the projected motion vector may be used to reduce the size of the area searched for block matching to generate a prediction motion vector for motion estimation. By one option, the projection-based MVs are used to form candidate predictions. By other options, an over-ride mode may be used where inter-prediction is set as the prediction mode whenever a projection-based prediction is present. The encoder transmits all MVs that are the basis for a selected prediction mode and residuals used for compression whether the MV is a projection MV or other prediction MV formed by motion estimation. By one form, the decoder will work just as usual and will not differentiate between projection MVs and MVs formed by motion estimation.

Figure 6:
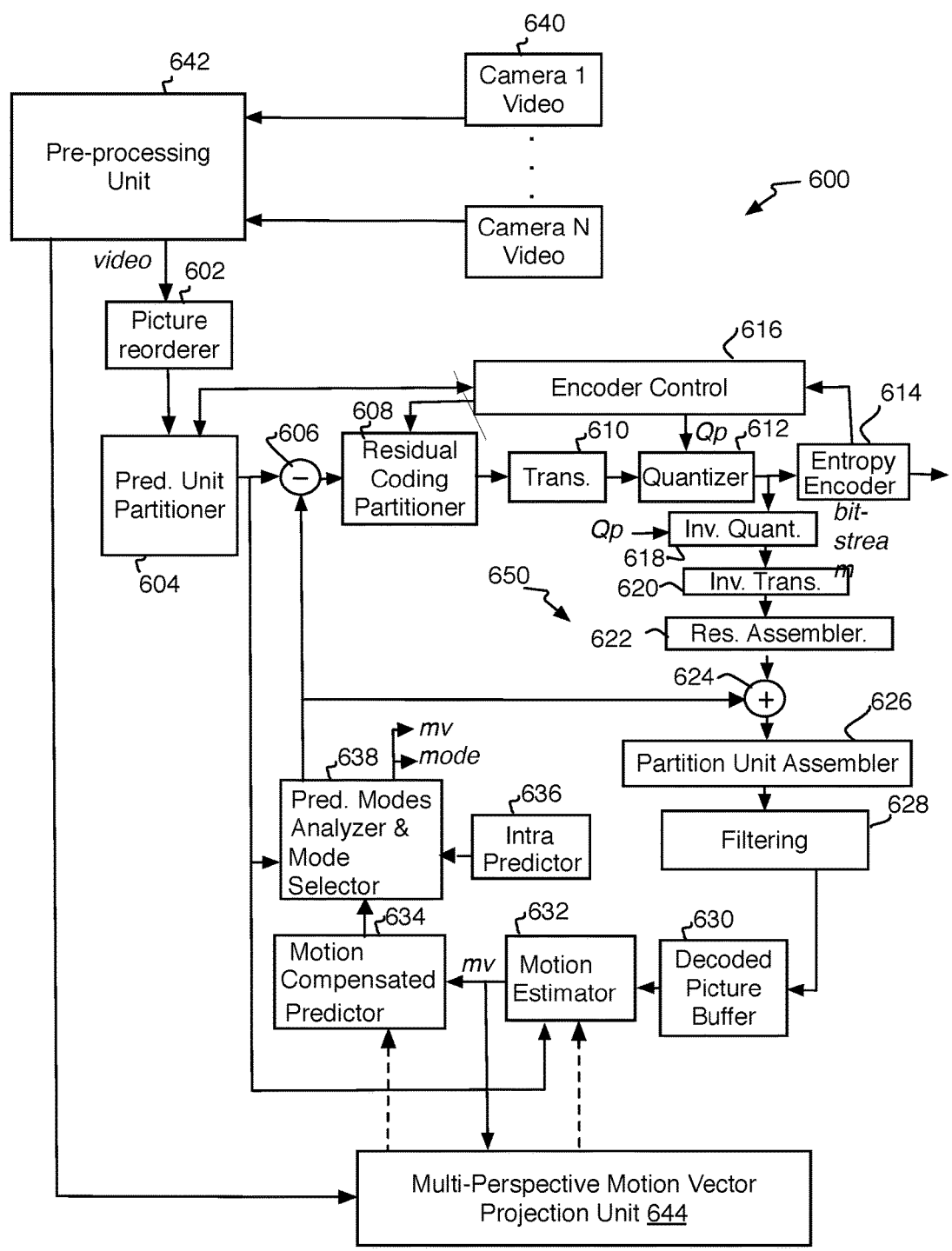
FIG. 6 is a schematic diagram showing an encoder to implement the video coding using projected motion vectors in accordance with the implementations herein.

Referring to FIG. 6, a video coding system 600 is described for better understanding of the implementations of the methods of video coding using projected motion vectors described herein, and is arranged to perform at least one or more of the implementations described herein. In various implementations, video coding system 600 may be configured to undertake video coding and/or implement video codecs according to one or more standards. Further, in various forms, video coding system 600 may be implemented as part of an image processor, video processor, and/or media processor and undertakes inter-prediction, intra-prediction, predictive coding, and residual prediction. In various implementations, system 600 may undertake video compression and decompression and/or implement video codecs according to one or more standards or specifications, such as, for example, H.264 (MPEG-4), advanced video coding (AVC), VP8, H.265 (High Efficiency Video Coding or HEVC), VP9, and others. Although system 600 and/or other systems, schemes or processes may be described herein, the present disclosure is not necessarily always limited to any particular video encoding standard or specification or extensions thereof.

For the example video coding system 600, the system may be one or more encoders where current video information in the form of data related to a sequence of video frames may be received for compression. By one form, the system 600 has an encoder that receives all video streams from each video camera 1 to n (640) being used to record the same scene amid the cameras, and by one form, the encoder simply encodes the images video sequence by video sequence as the video sequences are received by the encoder. By one alternative approach, however, the encoder could encode images across multiple video sequences and time set by time set where each time set is a set of images captured at or near the same time. By other options, the system may have multiple similar encoders that each receive a video stream from one or more of the cameras around the scene. Whether a separate unit as shown, a part of the cameras 640, or part of the encoders, a pre-processing unit 642 may be provided that performs tasks such as de-mosaicing, de-noising and so forth sufficient for both encoding and for motion vector projection as described herein. The frames of the video sequence to be compressed and to generate motion vectors to be used for motion vector projection are processed by the core encoder as follows.

The system 600 may partition each frame into smaller more manageable units, and then compare the frames to compute a prediction. If a difference or residual is determined between an original block and prediction, that resulting residual is transformed and quantized, and then entropy encoded and transmitted in a bitstream out to decoders or storage. To perform these operations, the system 600 may include an input picture buffer (with optional picture reorderer) 602, a prediction unit partitioner 604, a subtraction unit 606, a residual partitioner 608, a transform unit 610, a quantizer 612, an entropy encoder 614, and an encoder controller 616. The controller 616 manages many aspects of encoding including rate distortion or scene characteristics based locally adaptive selection of right motion partition sizes, right coding partition size, best choice of prediction reference types, and best selection of modes as well as managing overall bitrate in case bitrate control is enabled to name a few examples.

The output of the quantizer 612 may be provided to a decoding loop 650 provided at the encoder to generate the same reference or reconstructed blocks, frames, or other units as would be generated at the decoder. Thus, the decoding loop 650 may use inverse quantization and inverse transform units 618 and 620 to reconstruct the frames, and residual assembler 622, adder 624, and prediction unit assembler 626 to reconstruct the units used within each frame. The decoding loop 650 then provides filters 628 to increase the quality of the reconstructed images to better match the corresponding original frame. This may include a deblocking filter, a sample adaptive offset (SAO) filter, and a quality restoration (QR) filter. The decoding loop 650 also may have a decoded picture buffer 630 to hold reference frames.

The encoder 600 also has a motion estimation module or unit 632 that provides motion vectors as described below, and a motion compensation module 634 that uses the motion vectors to form prediction blocks. The motion estimation unit 632 and motion compensation unit 634 form the inter-prediction capability of the encoder. The motion estimator 632 may use a variety of techniques to form the motion vectors including block matching such as hierarchical motion estimation (HME), integer motion estimation (IME), fractional motion estimation (FME), motion vector spatial dependencies, and zero motion vectors (ZMVs) to name a few examples. An intra-frame prediction module 636 provides the intra-prediction capability. Both the motion compensation module 634 and intra-frame prediction module 636 may each provide one or more predictions to a prediction mode analyzer and mode selector 638 that selects the best prediction mode for a particular block.

As shown in FIG. 6, the prediction output of the selector 638 in the form of a prediction block is then provided both to the subtraction unit 606 to generate a residual, and in the decoding loop to the adder 624 to add the prediction to the residual from the inverse transform to reconstruct a frame. A PU assembler (not shown) may be provided at the output of the prediction mode analyzer and selector 638 before providing the blocks to the adder 624 and subtractor 606 for HEVC operation.

More specifically, the video data in the form of frames of pixel data may be retrieved and provided to the input picture buffer or reorderer 602 with the video sequence from one camera (or camera position) after another. By other alternatives, the encoder (or encoders) could encode frames in a time-based order so that frame sets for the same time period and across multiple video sequences of the multiple camera positions are encoded consecutively instead before processing the frames of the next time period. In this case, data of the video sequences may be swapped in and out of memory as needed for a particular image being coded. The video sequences could be placed back into video sequence by video sequence order for placement in the bitstream for transmission.

For a particular video sequence being encoded (whether ongoing or at the moment for the time set by time set based encoding), the buffer 602 holds frames in an input video sequence order, and the frames may be retrieved from the buffer in the order in which they need to be coded. For example, backward reference frames are coded before the frame for which they are a reference but are displayed after it. The input picture buffer also may assign frames a classification such as I-frame (intra-coded), P-frame (inter-coded, predicted from a previous reference frames), and B-frame (inter-coded frame which can be bi-directionally predicted from a previous frames, subsequent frames, or both). In each case, an entire frame may be classified the same or may have slices classified differently (thus, an I-frame may include only I slices, P-frame can include I and P slices, and so forth. In I slices, spatial prediction is used, and in one form, only from data in the frame itself. In P slices, temporal (rather than spatial) prediction may be undertaken by estimating motion between frames but also may include spatial dependencies to derive motion vectors as explained herein. In B slices, and for HEVC, two motion vectors, representing two motion estimates per partition unit (PU) (explained below) may be used for temporal (and spatially dependent MV) prediction or motion estimation. In other words, for example, a B slice may be predicted from slices on frames from either the past, the future, or both relative to the B slice. In addition, motion may be estimated from multiple pictures occurring either in the past or in the future with regard to display order. In various implementations, motion may be estimated at the various coding unit (CU) or PU levels corresponding to the sizes mentioned below. For older standards, macroblocks or other block basis may be the partitioning unit that is used.

Specifically, when an HEVC standard is being used, the prediction partitioner unit 604 may divide the frames into prediction units. This may include using coding units (CU) or large coding units (LCU). For this standard, a current frame may be partitioned for compression by a coding partitioner by division into one or more slices of coding tree blocks (e.g., 64×64 luma samples with corresponding chroma samples). Each coding tree block may also be divided into coding units (CU) in quad-tree split scheme. Further, each leaf CU on the quad-tree may either be split again to 4 CU or divided into partition units (PU) for motion-compensated prediction. In various implementations in accordance with the present disclosure, CUs may have various sizes including, but not limited to 64×64, 32×32, 26×26, and 8×8, while for a 2N×2N CU, the corresponding PUs also may have various sizes including, but not limited to, 2N×2N, 2N×N, N×2N, N×N, 2N×0.5N, 2N×1.5N, 0.5N×2N, and 2.5N×2N. It should be noted, however, that the foregoing are only example CU partition and PU partition shapes and sizes, the present disclosure not being limited to any particular CU partition and PU partition shapes and/or sizes.

As used herein, the term "block" may refer to a CU, or to a PU of video data for HEVC and the like, or otherwise a 4×4 or 8×8 or other rectangular shaped block. By some alternatives, this may include considering the block a macroblock or a division of a macroblock of video or pixel data for H.264/AVC, VP8, VP9, and the like, unless defined otherwise.

Also in video coding system 600, the current video frame divided into LCU, CU, and/or PU units may be provided to the motion estimation unit or estimator 632. System 600 may process the current frame in the designated units of an image in raster or different scan order such as waveforms. When video coding system 600 is operated in inter-prediction mode, motion estimation unit 632 may generate a motion vector in response to the current video frame and a reference video frame by a number of different block-based search methods that may be used to match a block of a current frame with one or more candidate blocks on a reference frame, and thereby determine a motion vector to be encoded for a prediction block. The motion compensation module 634 then may use the reference video frame and the motion vector provided by motion estimation module 632 to generate the predicted frame (or block). It will also be understood that for those standards that provide for alternative prediction block sizes, such as HEVC, alternative motion vectors may be provided for each or some predetermined set of block sizes. Each alternative motion vector for the same area of an image may be provided to the motion compensation unit 634 and an alternative prediction block may be formed and used as a candidate for prediction mode selection. As explained below, each candidate MV also may be used to form an alternative projection MV on another image of another camera position. Thus, the system may provide the option to provide candidate projection motion vectors to the motion compensator 634 for prediction mode selection. In this case, all source candidate MVs for a single area of image data with alternative blocks for inter-prediction and from source frames may be provided to the multi-perspective motion vector projection unit 644 to determine the candidate projection motion vectors. By yet another approach, the system may have an over-ride mode that over-rides normal prediction mode selection to always select a prediction mode as inter-prediction that is based on a projection-based prediction when it exists. The projection motion vector or projection-based motion vector when from motion estimation that is the basis of the projection-based prediction will be used to form a residual and transmitted. This may still involve a prediction mode selection when multiple projection-based predictions exist, or prediction mode selection may be completely skipped when only a single projection-based prediction exists even though other non-projection based predictions were computed, or could have been computed.

The predicted block then may be subtracted at subtractor 606 from the current block, and the resulting residual is provided to the residual coding partitioner 608. Coding partitioner 608 may partition the residual into one or more blocks, and by one form for HEVC, dividing CUs further into transform units for transform or further compression, and the result may be provided to a transform module 610. The relevant block or unit is transformed into coefficients using variable block size discrete cosine transform (VBS DCT) and/or 4×4 discrete sine transform (DST) to name a few examples. Using the quantization parameter (Qp) set by the controller 616, the quantizer 612 then uses lossy resampling or quantization on the coefficients. The generated set of quantized transform coefficients may be reordered and entropy coded by entropy coding module 614 to generate a portion of a compressed bitstream (for example, a Network Abstraction Layer (NAL) bitstream) provided by video coding system 600. In various implementations, a bitstream provided by video coding system 600 may include entropy-encoded coefficients in addition to side information to be used to decode each block (e.g., prediction modes, quantization parameters, motion vector information, partition information, in-loop filtering information, and so forth), and may be provided to other systems and/or devices for transmission or storage.

The output of the quantization module 612 also may be provided to de-quantization unit 618 and inverse transform module 620 in a decoding loop. De-quantization unit 618 and inverse transform module 620 may implement the inverse of the operations undertaken by transform unit 610 and quantization module 612. A residual assembler unit 622 may then reconstruct the residual CUs from the TUs. The output of the residual assembler unit 622 then may be combined at adder 624 with the predicted frame to generate a rough reconstructed block. A prediction unit (LCU) assembler 626 then reconstructs the LCUs from the CUs to complete the frame reconstruction.

The reconstructed frames are filtered, and then provided to a decoded picture buffer 630 where the frames may be used as reference frames to construct corresponding predictions for motion estimation and compensation as explained herein. When video coding system 600 is operated in intra-prediction mode, intra-frame prediction module 636 may use the reconstructed pixels of the current frame to undertake intra-prediction schemes that will not to be described in greater detail herein.

The multi-perspective motion vector projection unit 644 receives pre-processed images of the multiple camera positions used to record the same scene, whether by multiple cameras or one camera (with a fixed scene). The MV projection unit 644 obtains the motion vectors of two of the images by one example and from the motion estimator 632. More precisely though, the motion estimator 632 may place source motion vectors in an MV buffer for use with a current frame, and the projection unit 644 may retrieve the source motion vectors from the MV buffer for projection with one or more subsequent frames. Then for a subsequent or target frame being processed from a different camera position than that used to obtain the source motion vectors, the motion vectors are then projected to form a composite motion vector, and the MV projection unit 644 projects the composite MV to the target image being processed. The final projection MV, after adding a height component when needed, is then provided to the motion compensation unit 634 so the final MV can be used to form a prediction for prediction mode selection and may eliminate the need for the motion estimation unit 632 to perform a search and compute the motion vector for a block or other unit of image data. By another alternative, the final MV is provided to the motion estimation unit 632 which uses the final projection MV to reduce the search area for block matching, which then finds and computes a prediction motion vector for the block of image data being analyzed. As mentioned, alternatively, the system may over-ride the usual prediction mode selection process and use the final projection motion vector to indicate the inter-prediction mode is to be selected by the prediction mode selector and the other candidates are dropped. Whether a projection-based motion vector or not, the MV is placed in the bitstream to the decoder when it is associated with a selected inter-prediction mode.

In some examples, video coding system 600 may include additional items that have not been shown in FIG. 6 for the sake of clarity. For example, video coding system 600 may include a processor, a radio frequency-type (RF) transceiver, splitter and/or multiplexor, a display, and/or an antenna.

Further, video coding system 600 may include additional items such as a speaker, a microphone, an accelerometer, memory, a router, network interface logic, and so forth. Some of these components are shown on other implementations described herein.

Figure 7:
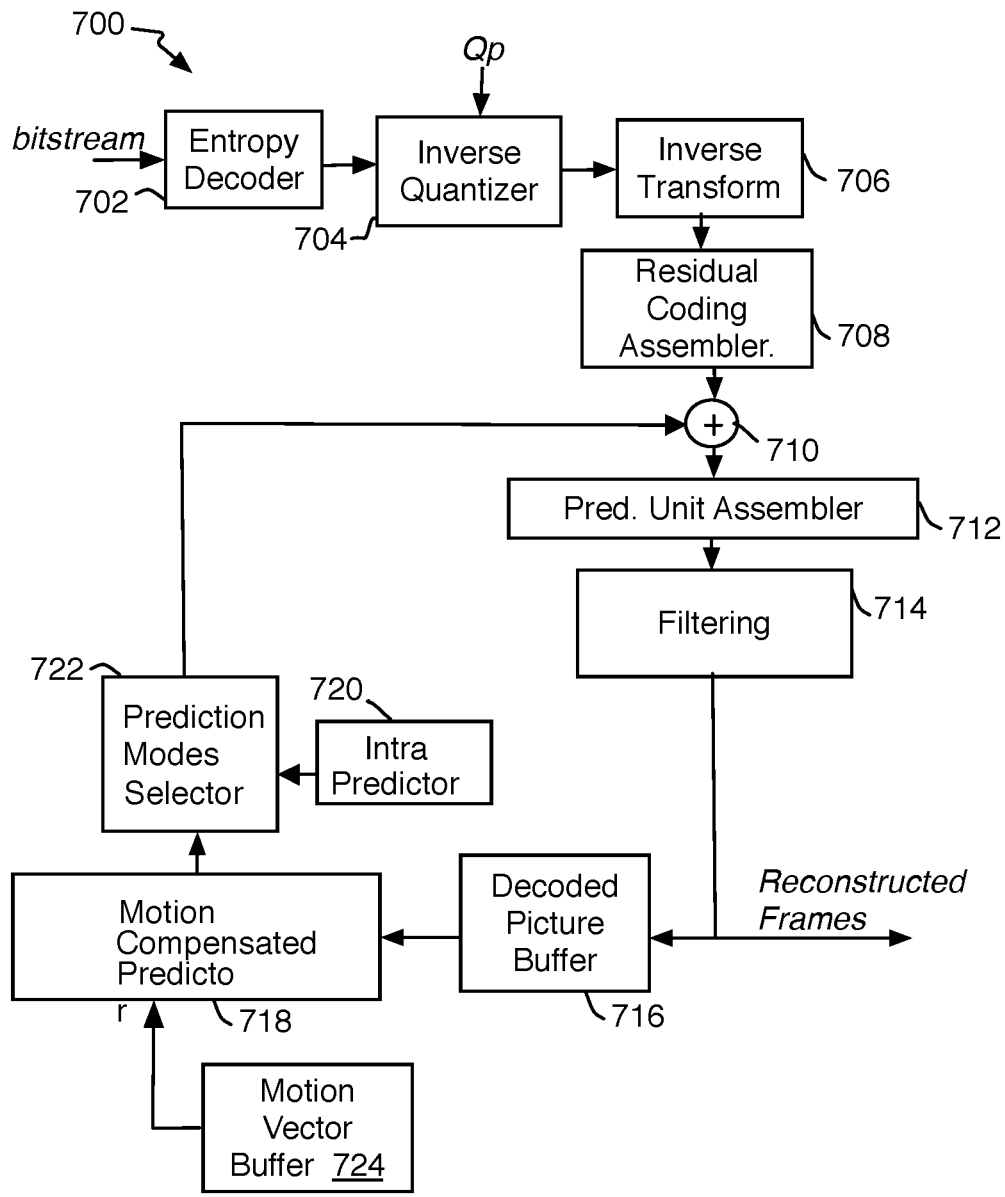
FIG. 7 is a schematic diagram showing a decoder to implement the video coding using projected motion vectors in accordance with the implementations herein.

Referring to FIG. 7, a system 700 may have, or may be, a decoder, and may receive coded video data in the form of a bitstream and that has residuals, motion vectors, and prediction modes for individual blocks. The motion vectors may include both source motion vectors from source images and projection motion vectors from target images. The projection motion vectors may be provided in the bitstream only when inter-prediction based on a projection motion vector is selected as the prediction mode for a block, and this may occur whether only a single projection motion vector is formed or multiple candidate projection motion vectors were formed at the encoder. Otherwise, all candidate projection motion vectors could be provided for a block in the decoder when the decoder has such prediction mode selection capability. The system 700 may receive a compressed video sequence from one camera position after another, and may decode the video sequences as they are received. Otherwise, multiple decoding systems could be used where video sequences from different camera positions are decoded simultaneously.

The system 700 may process the bitstream with an entropy decoding module 702 to extract quantized residual coefficients as well as the motion vectors, prediction modes, partitions, quantization parameters, filter information, and so forth. The system 700 then may use an inverse quantizer module 704 and inverse transform module 706 to reconstruct the residual pixel data. The system 700 then may use a residual coding assembler 708, an adder 710 to add the residual to the predicted block, and a prediction unit (LCU) assembler 712. The system 700 also may decode the resulting data using a decoding loop employed depending on the coding mode indicated in syntax of the bitstream and implemented via prediction mode switch or selector (which also may be referred to as a syntax control module) 722, and either a first path including an intra prediction module 720 or a second path that is an inter-prediction decoding path including one or more filters 714. The second path may have a decoded picture buffer 716 to store the reconstructed and filtered frames for use as reference frames as well as to send off the reconstructed frames for display or storage for later viewing or to another application or device.

A motion compensated predictor 718 utilizes reconstructed frames from the decoded picture buffer 716 as well as motion vectors from the bitstream to reconstruct a predicted block. Thus, the decoder does not need its own motion estimation unit since the motion vectors are already provided. Also, decoders do not usually need a prediction mode selector that analyzes candidate predictions because the prediction mode selected at the encoder is placed in the bitstream. However, some decoders do provide such capability. In these cases, the decoder may provide projected motion vectors to a motion estimation unit to reduce the search area and prediction mode selection may be performed as with the encoder.

As mentioned, the prediction modes selector 722 sets the correct mode for each block typically based on the prediction mode selected at the encoder and indicated in the bitstream but not always, and a PU assembler (not shown) may be provided at the output of the selector 722 before the blocks are provided to the adder 710. The functionality of modules described herein for systems 600 and 700, and aspects of the motion estimator unit 732 for example and described in detail below, are well recognized in the art and will not be described in any greater detail herein.

Figure 8B:
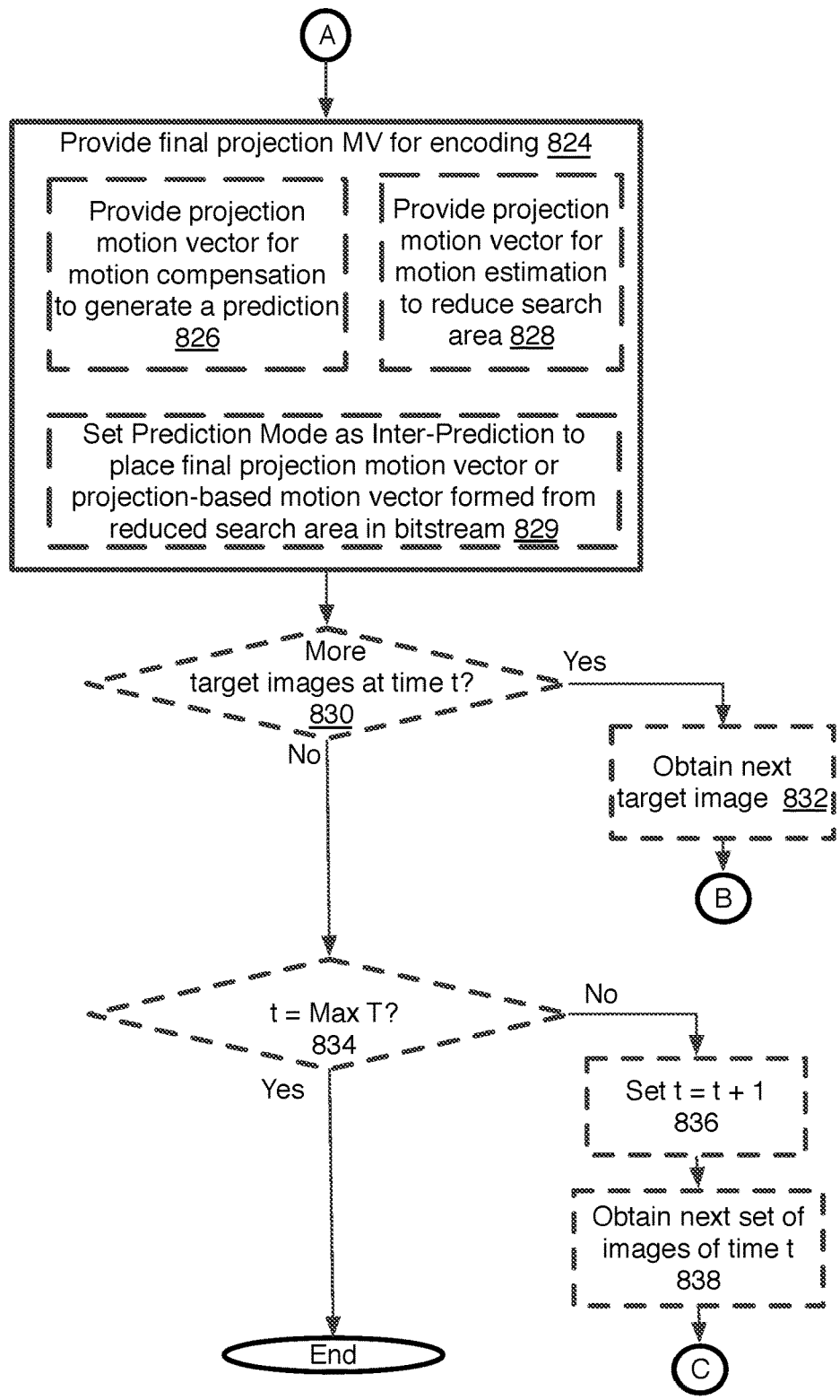

Referring now to FIGS. 8A-8B, an example process 800 is arranged in accordance with at least some implementations of the present disclosure. In general, process 800 may provide a computer-implemented method of video coding using projected motion vectors. In the illustrated implementation, process 800 may include one or more operations, functions or actions as illustrated by one or more of operations 802 to 838 numbered evenly. By way of non-limiting example, process 800 may be described herein with reference to operations discussed with respect to FIGS. 1-4, 6-7 and 11 herein, and may be discussed with regard to example systems 600, 700 or 1100 herein.

The process 800 may comprise "obtain image data of images of multiple camera positions around the same scene location and at different angles relative to the scene" 802. The images may be obtained, as mentioned above, either from multiple cameras each mounted at a camera position around the same scene, or alternatively could be one or more cameras that are placed at multiple camera positions when the objects in the scene being recorded are not moving substantially. When multiple cameras are used, the cameras may be completely stationary. In other cases, the cameras may be merely stationary relative to each other. In other words, the camera may be able to rotate left and right and up and down, and have zoom in and out, but cannot itself translate in any direction. By other options, the cameras may be completely mobile whether land based on wheels or tracks for example, or air-based such as on drones or on other moving devices whether on land, air, or water. A single camera recording a scene could be moved to multiple positions by vehicle or on tracks for example. There is no particular limitation as long as the camera parameters are known when images are captured from the camera positions and at least including the camera x, y, z, position relative to the other camera positions and the direction of the optical axis of the camera at each position.

By the example presented herein, the camera positions are in the same plane and in a plane at or parallel to a XY projection plane for example. The camera positions may be a uniform angle spacing from each other, such as 45 degrees for eight camera positions, and may be equidistant from a center of a 3D space formed by the scene being recorded. Alternatively, the vertical positions, horizontal spacing, and distance from the 3D space may be varied.

The images are to be obtained by an encoder with a decoding loop that has inter-prediction capabilities, and that receives reconstructed and filtered reference frames as well as image data of the current frames to be encoded. A single frame may be divided into a variety of block sizes, and may be divided into alternative prediction blocks, as with the HEVC systems and as described elsewhere herein. The images may have been pre-processed and are ready for encoding, and this may include demosaicing and/or vignette elimination, noise reduction, pixel linearization, shading compensation, resolution reduction, temporal de-noising, image sharpening, color space conversion, dynamic range conversion, and so forth.

By one form, the images may be provided to the encoder one video sequence after another. In that case, two-camera positions may be selected as the camera positions to provide source motion vectors to be used to form projection motion vector projections for the video sequences of the other camera positions. To accomplish this, the source motion vectors of the first two video sequences are placed in memory, to be used for projection onto the remaining video sequence(s). The selection of the source cameras and camera positions may be pre-determined based on highest quality camera, best camera position and/or angle, or in some set order of the cameras (such as cameras 1 and 2 for cameras numbered 1 to 8). Otherwise, the source camera positions may be randomly set as the first two video sequences of the same time period received by a hub encoder.

By another alternative, the process 800 also may optionally comprise "set time t=1 and set max T" 804, and in the examples where each camera position has its own camera and the recordings of the cameras are synchronized, a time counter may or may not be used, but is added here to explain one example order of the operations herein. Thus, each frame recorded in a video sequence may be recorded at a time t (and may correspond to a timestamp for that frame) and may be provided in display order up to a maximum T of the last frame in a video sequence. Those frames with the same time stamp or within a certain time range from different video sequences of the multiple camera positions may be considered to form a set of frames or images for the same time period across the multiple video sequences with one frame in the time period from each included camera position.

Continuing the example, the process 800 may optionally include "obtain all images of time t" 806. The raw or pre-processed video sequences could be placed in memory accessible to the encoder, and then presented to the encoder with a set of frames t recorded at the same time. This way, the two source images of two source camera positions to provide source motion vectors either may be pre-determined or could be selected among the frames in a set of frames of the same time period and on-the-fly based on some quality criteria (such as motion vector length whether magnitude maximum and/or minimum to make sure the motion vector is not an outlier). If the selected motion vectors are not acceptable, a different set of replacement source cameras could then be selected until motion vectors are within acceptable parameters.

It will be appreciated that one further consideration for the present system is that other objects may be present and occluding the object under consideration in some camera views. Hence, for a projected MV to be valid, this operation may include first conducting a very small comparison (between MV area of the previous frame and current frame) to ensure that the object is indeed present or if another object has moved in front of it. While the main object would still be present, it would not be present in the image at that point in time, or parts of the object may not be noticeable due to occlusion of other objects. Thus, every frame in a sequence from one point of view may not be usable due to such an occlusion, and the system may check this, and may use some other frame at a time instead and that is a time different to the rest of the frames. Otherwise, a different time may be selected for all of the frames.

The process 800 may include "encode at least two images of two different camera positions at time t" 808. For systems encoding the frames video sequence by video sequence, this operation refers to encoding first and second video sequences as source video sequences while providing these first two video sequences for transmission to a decoder. Unlike conventional coding systems, however, the motion vectors of these first two video sequences are saved as source motion vectors after the compression of the video sequences and to be used for projection onto other target video sequences. Then, while the target video sequences are being encoded, whenever a target frame has the same time period as the source frames of the two saved source motion vectors, the two source motion vectors then may be used to form a projection motion vector for that target frame as explain herein.

By the option where the frames are encoded by time set and a single encoder is used, the system may determine which frames are to provide the source motion vectors for a time set when it can be different from time set to time set. It then provides the video sequence data to the encoder in order to encode that frame. Thus, any reference frames or other data needed to encode a source frame that provides at least one source motion vector is then provided to the encoder. Then, the video sequence for that data is removed from memory and saved, and the data for another video sequence is placed in memory where it is accessible for encoding. Once the first source frame used to form a source motion vector is encoded, then another frame at the same time period as the first source frame is encoded to provide the second source motion vector. Thereafter, the video sequence data is then replaced at memory accessible for encoding to encode a next target frame of yet another video sequence (of another camera position) to project the source motion vectors to that next target frame, and so on.

It will be understood that the frames being used for projection motion vectors in each video sequence from each camera position may not be consecutive frames but could be some interval such as every other frame, or certain types of frames such as P-frames, and so forth.

Then, the process 800 may include "obtain source motion vectors of the at least two images" 810, and therefore, the generated source motion vectors are obtained from memory, such as RAM, to be projected to a current target frame being analyzed and of the same time period as the frames used to obtain the source motion vectors no matter which process is used to generate the source motion vectors. By one form, the target frame is from a different camera position than either or any source camera position.

The process 800 may include "project motion vectors to a projection plane of a 3D space" 812, and as explained with projection space 400, the source motion vectors or the horizontal component of the source motion vector may be projected vertically by parallel lines to the X and Y axes, or positions parallel to the X and Y axes and on the XY projection plane. The source motion vector or vertical component of the source motion vector also is projected to the Z axes. This refers to the projection of perpendicular lines to form the axes motion vectors MN and PQ as on projection space 100 and 400. Thus, this projection includes a vertical projection distance z=Ht when the source motion vector has its start end (at the current frame end versus the reference frame end) at a height Ht from the XY projection plane. The height Ht may or may not be a different height than the height K of the camera plane. This operation also may be considered to include or be accompanied by a projection of the vertical component (such as RS on space 100 (FIGS. 1-3)) to the Z axis, or at least determining the vertical source component distance, if any, for later use. It also should be clear that the 3D space 402 need only be defined at a minimum by the three X, Y, Z axes and the camera positions located relative to that space. This space may be formed before, or separately from, any or very little analysis occurs to create a 3D space defined by a depth map or depth surface where many individual pixels have 3D data (x, y, and z coordinates).

The process 800 may include "project axes projections into XY projection plane to form composite motion vector" 814. Now, the MV MN on or parallel to the X axis is projected within the XY projection plane as the horizontal component of the composite motion vector (CD in space 400), while the MV PQ on or parallel to the Y axis is projected inward on the XY projection plane as the y component of the composite motion vector (CD in space 400), thereby forming the horizontal component of a final projection motion vector.

The process 800 may include "determine length and angle of composite motion vector relative to a common line" 816. The common line may be the x-axis in the present examples. An angle α (as shown on space 400) can be computed using the horizontal components of the source motion vectors VW and IJ, as:

$$\alpha = \tan^{-1}(VW/IJ) \quad (3)$$

The length of the composite motion vector CD may be computed using the Pythagorean Theorem as:

$$CD = (VW^2 + IJ^2)^{1/2} \quad (4)$$

The process 800 may include "obtain angle of camera position of target image, where the angle is relative to the common line" 818. Thus, a camera angle CamAnglex may be relative to the X axis in the present example. This is the angle of the camera position, and in turn, the angle of the target image formed from that camera position, and that will receive the projection motion vector. By one example form, the CamAnglex is measured from the 0 degree direction of the X axis, and then positive when measuring in the counter-clockwise direction up to 180°, and negative when measuring in a clockwise direction up to −180°.

Figure 9:
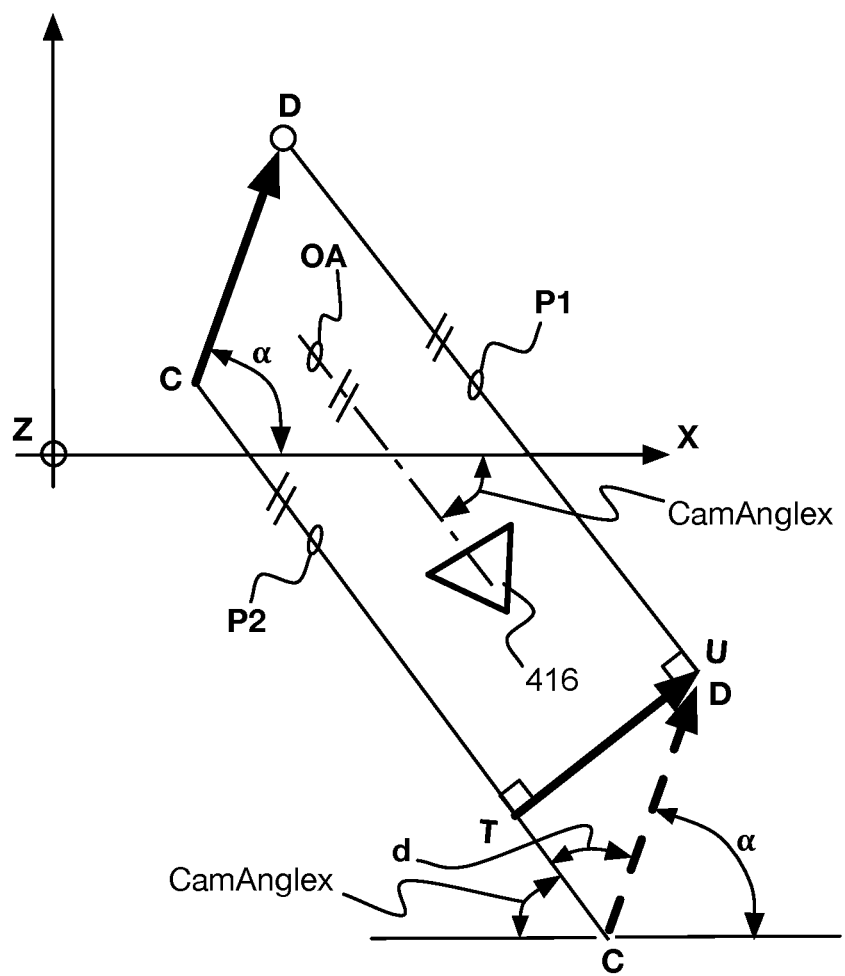
FIG. 9 is a schematic diagram to assist with explaining the motion vector projection in accordance with the implementations herein.

Referring to FIG. 9, the process 800 may include "compute length of projection MV" 820. This may be computed as:

$$TU = CD * \sin(\text{CamAngle}x - \alpha) \quad (5)$$

where this equation will be accurate no matter the angle of a and CamAnglex as long as CamAnglex is negative from one direction (clockwise or counter-clockwise) up to −180° and positive from the opposite direction up to 180°. Shown on diagram or space 900 to explain equation (5), there are a number of different ways to show how the angles can be subtracted to compute projection motion vector TU on the target image. The projection lines P1 and P2 are projected from the ends of composite motion vector CD and parallel to the optical axis OA of the camera position 416 in this example. This establishes the horizontal ends of the projection motion vector TU where TU is perpendicular to the optical axis OA in top view. For the quadrant shown, relative to CD, on space 900, equation (5) determines an angle d and then uses the law of sin or cos to determine the length of TU, where d is a reference angle d=180−CamAnglex−α. Equation (5) works no matter the value of CamAnglex (within 0 to +/−180) and α(within 0 to 90), and no matter which quadrant the camera position is located (where the center of the composite MV is considered the center of the quadrants where each quadrant may have a different positive or negative angle values for equation (5), because of the law of reference angles where the sin of 180−d is the same as the sin of d.

The process 800 may include "project composite motion vector to target image to form projection MV" 821. Thus, the start end of the projection motion vector may be placed at a height z=Ht on the target image. The projection motion vector TU extends the computed length and perpendicularly from projection line P1 to P2.

When the vertical component of the source motion vectors is not zero (the projection to the Z axis has a non-zero length), then the projection motion vector TU is a horizontal component of a final projection motion vector, such as MV TL shown in space 400 (FIG. 4). In that case, the process 800 may include "add Z axis projection as vertical component to projection MV to form final projection MV" 822. This is the vertical component MV RS that either forms VW and IJ or is the vertical component of a source motion vector when VW and IJ are merely horizontal component motion vectors of a source motion vector. The result is the establishment of the final projection motion vector TL when a vertical component exists, or TU is the final projection motion vector when the vertical component is zero.

The process 800 may include "provide final projection MV for encoding" 824, and this may include providing a final projection motion vector for each or individual blocks on a target image, and including any alternative projection motion vectors for standards such as HEVC that supports the testing of alternative inter-prediction motion vectors for prediction mode selection. Thus, by one of many possible examples, a macroblock of 16×16 pixels may have one final projection motion vector while each of the 8×8 blocks within the macroblock also has an alternative final projection motion vector.

The projection motion vector may be used in a number of different ways. Thus, the process 800 may include "provide projection motion vector for motion compensation to generate a prediction" 826. By this form, the projection motion vector is provided to the motion compensation unit in the same form as those motion vectors from the motion estimation unit at an encoder and including the magnitude (length), direction, and starting point location of the motion vector which may be an indication of the position of the associated block on the current frame being analyzed. The motion compensation unit uses known algorithms to generate a prediction for each motion vector, whether it is a final projection motion vector or a motion vector provided by the motion estimation unit. The prediction is then treated as a candidate prediction that may or may not be selected during a prediction mode selection process that determines which prediction mode has the least bit cost for example, and should be used to form a residual that is transmitted to the decoder(s) with the associated motion vector.

Alternatively or additionally, the process 800 may include "provide projection motion vector for motion estimation to reduce search area" 828. For normal brute blocking matching searches during motion estimation, a motion vector is determined by finding the best match between a current block of image data on a current frame being analyzed and a block on a reference frame and by testing each block on the reference frame. Other systems use a wide pattern of blocks to search the entire image. Either way, this consumes a relatively substantial amount of time both in terms of the total time for encoding that can cause delay and the processor time that could be spent processing other tasks whether or not related to the encoding. When the projection motion vector is received on a system with a relatively lower accuracy, such as systems that do not have sufficiently precise distance and angular measurements between cameras, the accuracy of the projection of source motion vectors to form a composite and then final projection motion vector may not be sufficiently precise for direct motion compensation. However, the motion estimation unit can at least use the projection motion vector to reduce the area of the search to find the matching block on the reference frame. This may be performed by limiting the area of the search to some consecutive block or block pattern limit such as within two blocks, and so forth, or may be determined by calibration. For instance, once a level of tolerance is identified, it may be applied to the search algorithm. The same algorithm may be used as that without using projection vectors but within the tolerance limits. Alternatively, some search algorithms may perform better than others within certain tolerance ranges and that may be selected for use. Such search algorithms or patterns include those with concentric rings of search points in some predefined pixel spacing pattern, although many other different patterns may be used. The projection-based motion vector determined by the motion estimation unit is then provided for motion compensation and can be used for prediction mode selection just like any other motion vector that does not use the projection motion vectors.

The process 800 then may include "set prediction mode as inter-prediction to place final projection motion vector or projection-based motion vector formed from reduced search area in bitstream" 829. As mentioned above, the final projection motion vector may be used as a prediction to determine a prediction mode among a group of candidate predictions whether or not that includes other inter-prediction based prediction candidates or both inter and intra based prediction candidates for prediction mode selection. In this case, the encoder may or may not select the projection-based prediction as the final prediction, and when not, the final projection motion vector is not placed in the bitstream to be transmitted to decoders and is dropped.

This operation, however, also may refer to an over-ride mode where the prediction mode selection unit must select a projection-based inter-prediction mode as the best mode to form a residual and place the associated final projection motion vector or projection-based motion vector in the bitstream for transmission to the decoder(s). Thus, either other prediction candidates are not computed at all, or if generated, the other candidates are dropped in favor of the projection-based inter-prediction mode. This may occur for predictions based on both projection motion vectors directly received for motion compensation, and projection-based motion vectors generated by using the final projection motion vector to reduce the search area for motion estimation. When multiple projection-based prediction candidates exist, such as with alternative motion vectors for alternative block sizes in HEVC, the prediction mode selection then may be performed as usual but just among the projection-based prediction candidates.

Otherwise, many other examples exist such as using the final projection motion vector both directly for motion compensation and area reduction for motion estimation, where both candidates may be considered for prediction mode selection.

The process 800 may include "more target images at time t?" 830. For systems that are encoding the frames video sequence by video sequence, this operation refers to an operation to determine whether source motion vectors are stored from earlier source video sequences with the same time t as a current frame at time t on a current video sequence being analyzed. If so, the process 800 may include "obtain next target image" 832, and in the current video sequence to repeat the process to determine the final projection motion vector(s) for that target image. The process ends when the last video sequence received by the encoder(s) is processed, during or before the data is transmitted for decoding and display, storage, or further encoding and transmission.

Alternatively, for systems that are encoding the frames time set by time set across the multiple video sequences, the system repeats and obtains the next target image 832 for each target image that needs final projection motion vector(s) in the set. Also for the time set by time set encoding, the process 800 may include query "t=Max T?" 834 to determine whether the ends of the video sequence have been reached. If not, the process 800 may include "set t=t+1" 836, and "obtain next set of images of time t" 838 to repeat the process for the next set of frames at the new time t. When max T is reached, such as at the ends of all of the video sequences being processed, the process ends and the compressed data is arranged in video sequence by video sequence order to transmit to known decoding systems.

With these motion vector projection processes where the search area for motion estimation is reduced or eliminated altogether, this results in a substantial time savings for encoding computations, which in turn reduces delays in transmission and that could result in pauses noticeable to a viewer at the decoder device. This also provides the processor with more capacity to perform other tasks.

Figure 10:
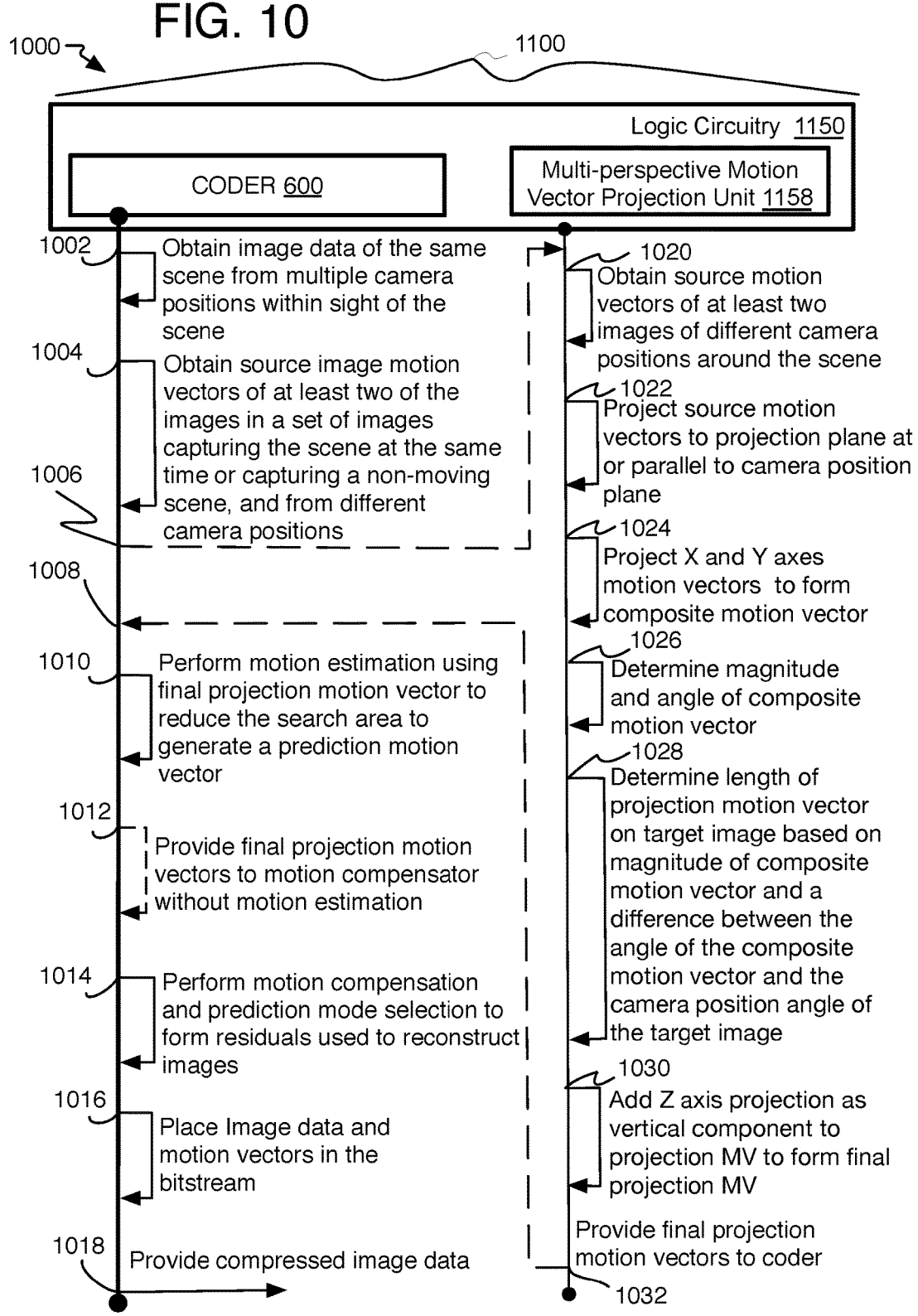
FIG. 10 is an illustrative diagram of an example system in operation for providing a method of video coding using projected motion vectors in accordance with the implementations herein.

Referring now to FIG. 10, system 1100 may be used for an example process 1000 of video coding using projected motion vectors shown in operation, and arranged in accordance with at least some implementations of the present disclosure. In the illustrated implementation, process 1000 may include one or more operations, functions, or actions as illustrated by one or more of actions 1002 to 1032 numbered evenly, and used alternatively or in any combination. By way of non-limiting example, process 1000 may be described herein with reference to operations discussed with respect to system 1100 or any of the other implementations described herein.

In the illustrated implementation, system 1100 may include a processing unit 1120 with logic units or logic circuitry or modules 1150, the like, and/or combinations thereof. For one example, logic circuitry or modules 1150 may include the video coder 600 (which may be or include an encoder) with inter-prediction capability. The components of the coder 600 relevant here, and similar to those with similar names on coder 600, include a motion estimation unit 1152, a motion compensation unit 1154, and a prediction mode selection unit 1156. The logic circuitry or modules 1150 also may include a multi-perspective motion vector projection unit 1158. Although system 1000, as shown in FIG. 10, may include one particular set of operations or actions associated with particular modules, these operations or actions may be associated with different modules than the particular module illustrated here.

Process 1000 may include "obtain image data of the same scene from multiple camera positions within sight of the scene" 1002, and as described above, from multiple positions around a scene to be recorded from different angles. As mentioned, this could be performed with multiple cameras for a moving scene where each camera position has its own camera, or one or more cameras could be moved to multiple camera positions when the scene does not move. The details are explained above.

By one form, the images are provided to the encoder one video sequence after another from the different camera positions, although other arrangements are mentioned above. Thus, the system, or specifically the encoder, may obtain access to pixel data of both the current blocks of a frame to be encoded and reconstructed frames to be used as reference frames. The data may be obtained or read from RAM or ROM, or from another permanent or temporary memory, as described on systems 1100 or 1200. The memory access may be continuous access for analysis of an ongoing video stream for example.

Process 1000 may include "obtain source image motion vectors of at least two of the images in a set of images capturing the scene at the same time or capturing a nonmoving scene, and from different camera positions" 1004, and this may include fully coding the first two video sequences, and storing the motion vectors as source motion vectors for each time period t that a set of images were captured of the common scene as described above. This may include one or more alternative candidate motion vectors for the same area on an image depending on whether alternative blocks are used as with HEVC standard for example and as described above. It is understood here that the source motion vectors may be used to perform motion compensation to generate candidate predictions which are then considered in prediction mode selection for their own frames. The source motion vectors may or may not be compressed and placed in the bitstream for transmission to a decoder depending on the selection of the prediction mode, but this is separate from the projection operations.

The process 600 then may provide 1006 the source motion vectors to the multi-perspective motion vector projection unit so that the unit may "obtain source motion vectors of at least two images of different camera positions around the scene" 1020. These two source motion vectors are from two different camera positions, and by this example from the first two video sequences encoded, and capturing the scene at the same time (or sufficiently near to the same time) as described above. The two source motion vectors are to be used to form a projection motion vector on an image from another camera position, although it could be projected back to the same source camera positions as well if that was ever desired.

In order to perform the motion vector projection, process 1000 may include "project source motion vectors to projection plane at or parallel to camera position plane" 1022. This refers to projecting the source motion vectors to a projection plane (here the XY plane) and by this example is a plane at or parallel to the plane of the camera positions formed by the optical axis of each camera positions. It will be understood, as described above, that variations could exist.

Also as mentioned, this operation could include a vertical projection of z=Ht for the source motion vector when the height of one end of the source motion vector, such as the lower end or end from the current frame being analyzed (versus the reference frame end), is not in the same plane as the projection plane (for example, the vertical projection from VW to PQ and from IJ to MN on space 400 (FIG. 4)). These projections may be considered projection to the X and Y axes, or positions parallel to the X and Y axes, and on the XY projection plane (referred to herein as X and Y axes motion vectors).

Thereafter, process 1000 may include "project X and Y axes motion vectors to form composite motion vector" 1024. Thus, the X and Y axes motion vectors are projected into the projection plane as x and y components to form a horizontal composite motion vector (CD in space 400 for example). Then, process 1000 may include "determine magnitude and angle of composite motion vector" 1026, where this is explained above with equation (4) using the Pythagorean Theorem. Since the position and length of the source motion vector projections onto the projection plane are known, the angle of the composite motion vector is known as well (equation 3 above).

Thereafter, process 1000 may include "determine length of projection motion vector on target image based on magnitude of composite motion vector and a difference between the angle of the composite motion vector and the camera position angle of the target image" 1028. Thus, as described with equation (5) above and with spaces 400 and 900, once the length and angle of the composite motion vector are determined, and the angle of the camera position is known, then the position of the final projection motion vector on the target image can be determined, or at least the horizontal component of the final projection motion vector can be determined. The start end (or current frame end) of the projection motion vector is placed at the same height z=Ht on the target image as the source motion vectors on the source images. More details are provided above.

Process 1000 may include "add Z axis projection as vertical component to projection MV to form final projection MV" 1030. When the vertical component of the source motion vectors is non-zero, then the vertical component of the source motion vectors on the Z axis (such as RS from space 100 (FIGS. 1-3), and mentioned as UL with space 400 (FIG. 4)), is then added to the horizontal projection motion vector to form the final projection motion vector. Otherwise, the horizontal projection motion vector formed from projecting the composite motion vector is the final projection motion vector.

Then, process 1000 may include "provide final projection motion vectors to coder" 1032, so that either the motion compensation unit or the motion estimation unit or both will "obtain final projection motion vectors" 1008. The process 1000 may include "perform motion estimation using final projection motion vectors to reduce the search area to generate a prediction motion vector" 1010. As explained above, the search for a block on a reference frame that matches a current block on a current frame may be limited to some certain amount of blocks or other pixel distance away from the block on the reference frame indicated by the final projection motion vector, such as an M×N pixel search area that may be reduced to ¹⁄₁₆th of the area (M/4*N/4) or ¹⁄₃₂ or ¹⁄₆₄. The benefit of using projection vectors to identify approximate regions for search is that normal search algorithms may not even search in regions close to the object if motion is large between two frames. If the source vector is determined, then the projection vector can be used to move the focus of the search to relevant areas. It follows that by one approach, more complex search methods or large search areas may be applied to determine the source vectors, and low complexity or small search area search methods may be applied after applying the projection vector to determine the approximate position of the object. This reduction in search area results in a significant amount of time and processing load reduction.

Alternatively, or additionally, process 1000 may include "provide final projection motion vectors to motion compensator without motion estimation" 1012, and by one form, by directly providing the final projection motion vectors for motion compensation, a prediction can be generated with each final projection motion vector while skipping the motion estimation searches for those blocks entirely, saving a tremendous amount of time and processing bandwidth. As mentioned though, this option may work most efficiently with systems with higher accuracy such as more precise measurements between camera positions and optical angle as discussed above.

Process 1000 may continue with "perform motion compensation and prediction mode selection to form residuals used to reconstruct images" 1014. The resulting projection-based motion vector, whether based on motion estimation or not, is then provided to the motion compensation unit to generate a candidate prediction that is used to determine a prediction mode for the current block along with any other inter or intra prediction candidates when they exist. Alternatively, an over-ride mode may be provided where the existence of a projection-based motion vector triggers the associated inter-prediction as the selected prediction mode. When a single final projection motion vectors exists for an area of an image (not covered by alternative blocks), inter-prediction mode is selected as the final prediction mode for that block and the projection-based motion vector is placed in the bitstream for transmission to the decoder. Otherwise, when alternative projection-based motion vectors exist for alternative blocks in the same image area, then inter-prediction is still elected as the final prediction mode except that the usual selection process may be implemented among the alternative projection-based predictions without consideration of other prediction modes whether intra, zero motion vector and so forth. This also may include those predictions based on reduced motion estimation searches from motion estimation, and not just the predictions based on direct receipt of the final projection motion vectors for motion compensation. By other options, both direct motion compensation and motion estimation projection motion vectors may be candidates for the same block. Other options are contemplated.

Process 1000 may continue with "place image data and motion vectors in the bitstream" 1016, and placed in video sequence by video sequence order as received by the encoder or regardless to the order the encoder received the images if not in the same video sequence by video sequence order. The process 1000 also may "provide compressed image data" 1018, such as to a decoder for decompression, and then display, storage, or re-encoding and re-transmission of the video sequences.

As mentioned, the video sequences could be encoded in other orders including time set by time set where each time set includes a set of images captured at or near the same time and from the different camera positions around the same scene, as described above.

While implementation of example process 500, 800, and/or 1000 may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 11:
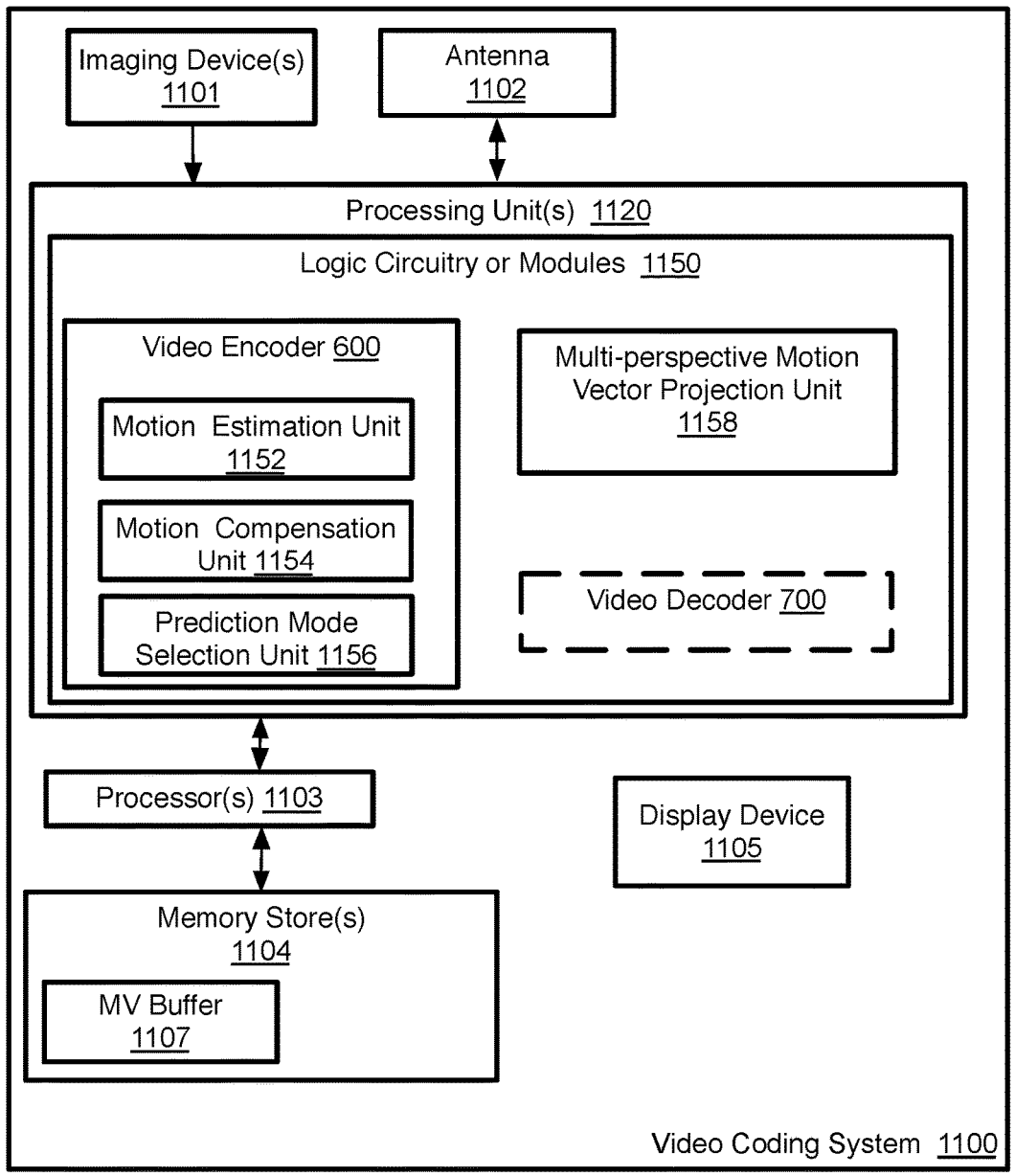
FIG. 11 is an illustrative diagram of an example system.

Referring to FIG. 11, an example image processing system (or video coding system) 1100 for providing video coding using projected motion vectors may be arranged in accordance with at least some implementations of the present disclosure. In the illustrated implementation, system 1100 may include one or more central processing units (CPUs) or processors 1103 and processing unit(s) 1120 to provide at least the encoder but could provide a decoder discussed herein as well, one or more imaging devices 1101 to capture images, an antenna 1102 to receive or transmit image data, a display device 1105, and one or more memory stores 1104. Processor(s) 1103, memory store 1104, and/or display device 1105 may be capable of communication with one another, via, for example, a bus, wires, or other access. In various implementations, display device 1105 may be integrated in system 1100 or implemented separately from system 1100.

As shown in FIG. 11, and discussed above, the processing unit 1120 may have logic circuitry 1150 with an encoder 600 and optionally with a decoder 700. The encoder 600 may have a motion estimation unit 1152, a motion compensation unit 1154, and a prediction mode selection unit 1156 among other units that need not be described here. The encoder 600 also may have a multi-perspective motion vector projection unit 1158. These units of the logic circuitry provide many of the functions and processes described herein.

As will be appreciated, the modules illustrated in FIG. 11 may include a variety of software and/or hardware modules and/or modules that may be implemented via software or hardware or combinations thereof. For example, the modules may be implemented as software via processing units 1120 or the modules may be implemented via a dedicated hardware portion. Also, system 1100 may be implemented in a variety of ways. For example, system 1100 (excluding display device 1105) may be implemented as a single chip or device having an accelerator or a graphics processor unit (GPU) which may or may not have image signal processors (ISPs), a quad-core central processing unit, and/or a memory controller input/output (I/O) module. In other examples, system 1100 (again excluding display device 1105) may be implemented as a chipset or a system on a chip (SoC). It will be understood antenna 1102 could be used to receive image data for encoding as well.

Otherwise, processor(s) 1103 may include any suitable implementation including, for example, microprocessor(s), multicore processors, application specific integrated circuits, chip(s), chipsets, programmable logic devices, graphics cards, integrated graphics, general purpose graphics processing unit(s), fixed function GPUs, other accelerators, or the like. The implementation is not limited as long as repetitive video coding tasks described above can be performed efficiently.

In addition, memory stores 1104 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1104 also may be implemented via cache memory. Memory store 1104 may hold a motion vector buffer that holds the source motion vectors, composite motion vectors, and/or projection motion vectors described above and until needed.

In various implementations, the example video coding system 1100 may use the imaging device 1101 to form or receive captured image data. This can be implemented in various ways. Thus, in one form, the image processing system 1100 may be one or more digital cameras or other image capture devices, and imaging device 1101, in this case, may be the camera hardware and camera sensor software, module, or component 1150. For a network of devices 1100 then, the devices transmit their video data to one of the devices 1100 or to a remote location to perform the video coding and motion vector projection processing described herein. In other examples, video coding system 1100 the imaging devices 1101 is a network of cameras at the camera positions described above, and logic modules 1150 may communicate remotely with, or otherwise may be communicatively coupled to, the imaging devices 1101 for further processing of the image data.

Thus, video coding system 1100 may be, or may be part of, or may be in communication with, a network of cameras at the camera positions described above, and which may be in any form for capturing images from commercial stationary cameras used at entertainment or sports events to small consumer devices, and including mobile cameras such as on drones. Otherwise a single movable camera that can move from camera position to camera position to capture an image of a stationary scene also may be used. Thus, the camera may take the form of a smartphone, tablet, laptop, or other mobile device such as wearables including smart glasses, smart headphones, exercise bands, and so forth. In any of these cases, such technology may include a camera such as a digital camera system, a dedicated camera device, or an imaging phone or tablet, whether a still picture or video camera, camera that provides a preview screen, or some combination of these.

Thus, in one form, imaging device 1101 may include camera hardware and optics including one or more sensors as well as auto-focus, zoom, aperture, ND-filter, auto-exposure, flash, and actuator controls. The imaging device 1101 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. In other examples, an RGB-Depth camera and/or microphone-array might be used in addition to or in the alternative to a camera sensor. In some examples, imaging device 1101 may be provided with an eye tracking camera. Otherwise, the imaging device 1101 may be any other device that records, displays or processes digital images such as video game panels or consoles, set top boxes, and so forth.

As illustrated, any of these components may be capable of communication with one another and/or communication with portions of logic modules 1150 and/or imaging device 1101. Thus, processors 1103 may be communicatively coupled to both the image device 1101 and the logic modules 1150 for operating those components. Although image processing system 1100, as shown in FIG. 11, may include one particular set of blocks or actions associated with particular components or modules, these blocks or actions may be associated with different components or modules than the particular component or module illustrated here.

Figure 12:
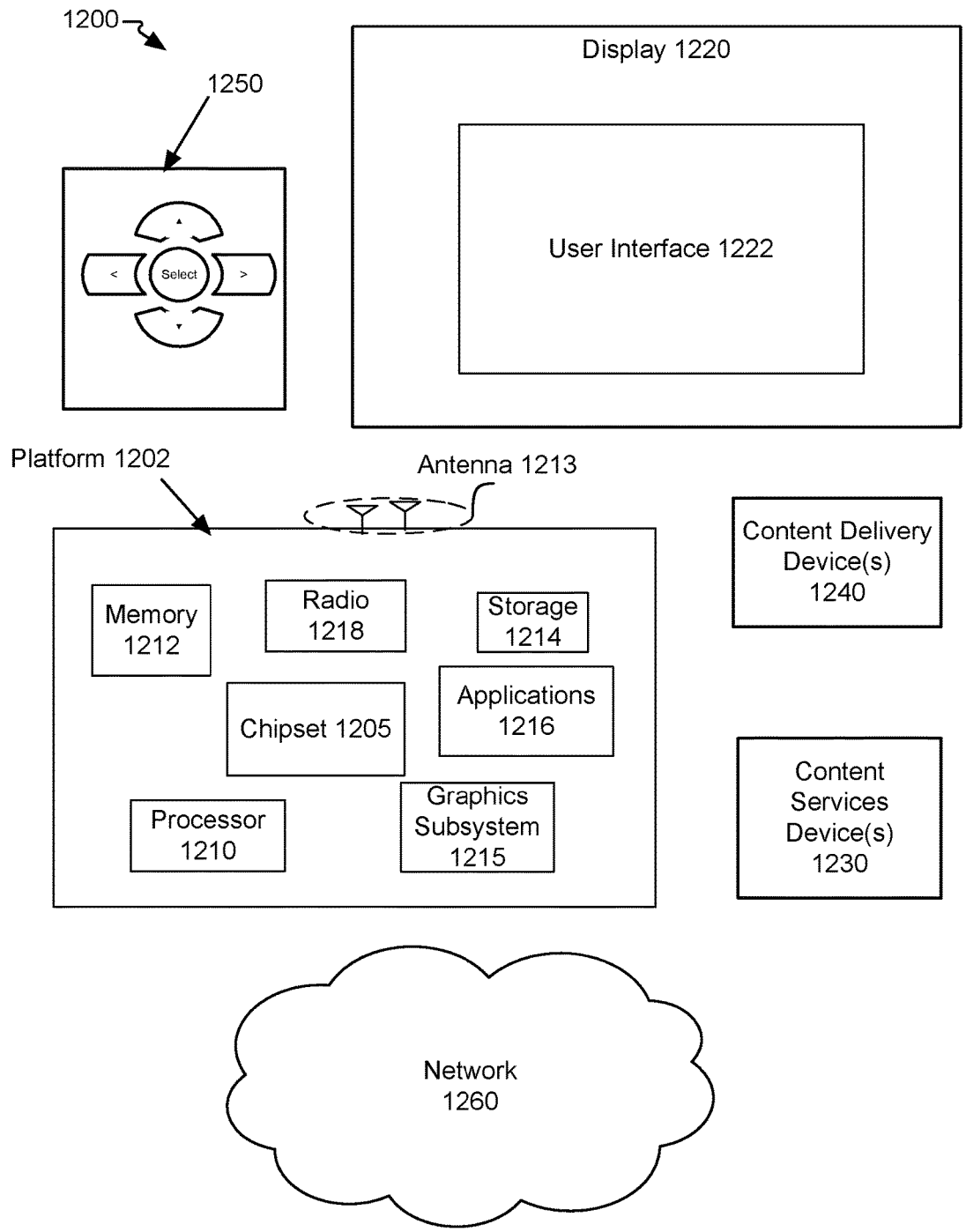
FIG. 12 is an illustrative diagram of another example system.

Referring to FIG. 12, an example system 1200 in accordance with the present disclosure and various implementations may embody system 1100 for example, and may be a media system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1200 includes a platform 1202 communicatively coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, storage 1214, graphics subsystem 1215, applications 1216 and/or radio 1218 as well as antenna(s) 1211. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, Display Port, wireless HDMI, and/or wireless HD compliant techniques. Graphics subsystem 1215 may be integrated into processor 1210 or chipset 1205. In some implementations, graphics subsystem 1215 may be a stand-alone card communicatively coupled to chipset 1205.

The graphics and/or video processing techniques described herein may be implemented in various hardware architectures including fixed function hardware such as video motion estimation (VME) engines or similar parallel processing circuits. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of unidirectionally or bidirectionally communicating content between content providers and platform 1202 and/display 1220, via network 1260 or directly. It will be appreciated that the content may be communicated unidirectionally and/or bidirectionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In implementations, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In implementations, controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various implementations, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various implementations, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 12.

Figure 13:
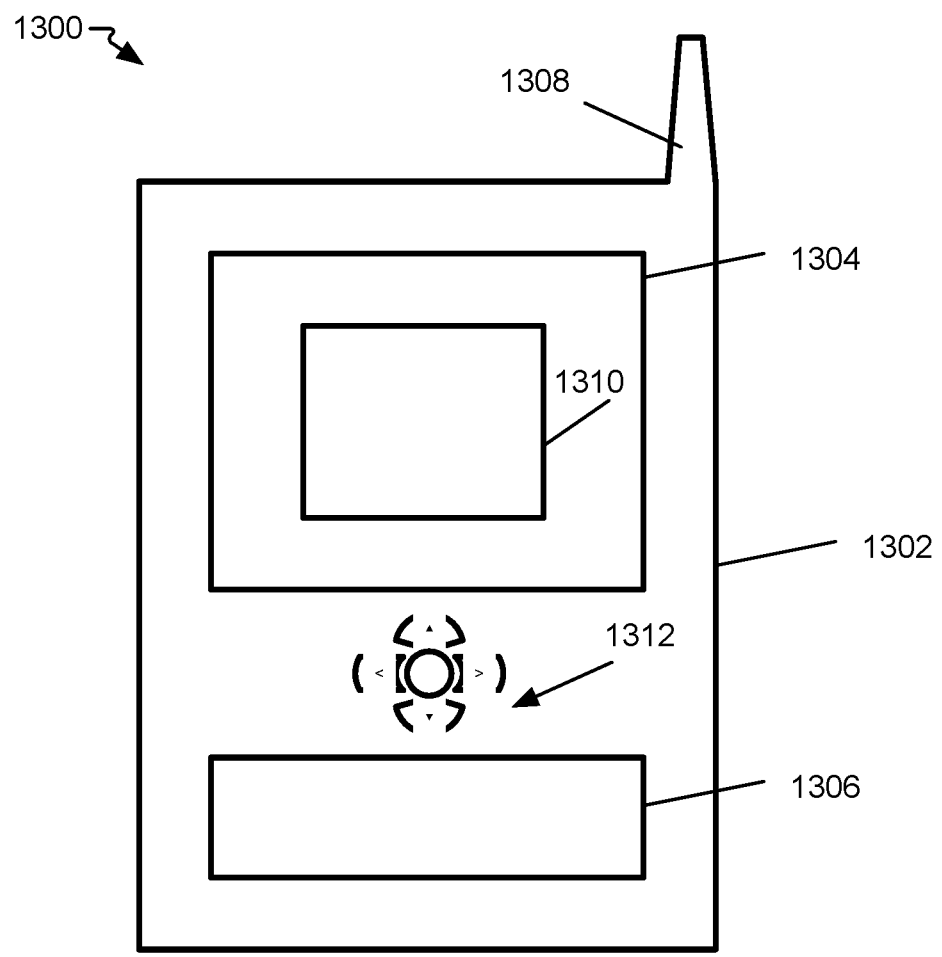
FIG. 13 illustrates another example device, all arranged in accordance with at least some implementations of the present disclosure.

As described above, system 1100 or 1200 may be implemented in varying physical styles or form factors. FIG. 13 illustrates implementations of a small form factor device 1300 in which system 1000 or 1100 may be implemented. In implementations, for example, device 1300 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 13, device 1300 may include a housing 1302, a display 1304, an input/output (I/O) device 1306, and an antenna 1308. Device 1300 also may include navigation features 1312. Display 1304 may include any suitable screen 1310 on a display unit for displaying information appropriate for a mobile computing device. I/O device 1306 may include any suitable I/O device for entering information into a mobile computing device. Examples for I/O device 1306 may include an alphanumeric keyboard, a numeric keypad, a touch pad, input keys, buttons, switches, rocker switches, microphones, speakers, voice recognition device and software, and so forth. Information also may be entered into device 1300 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects described above may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

A computer-implemented method of video coding comprises receiving pixel data of multiple images of the same scene and captured from multiple different camera positions at different angles relative to the scene; determining source motion vectors of images of at least two camera positions of the multiple camera positions and by using a prediction loop of a coder; and projecting the source motion vectors to form a projection motion vector on at least one image of the multiple camera positions to be used to encode the at least one image.

The method also may include at least one of: wherein the multiple images are captured by multiple cameras at substantially the same time period, and wherein the multiple images are captured by moving a single camera to multiple ones of the multiple different camera positions while the scene remains in the same stationary position when captured at the multiple different camera positions. Also, the method may include wherein the optical axes associated with the camera positions used to form the at least two and at least one images are in the same camera plane, and may comprise projecting the source motion vectors to a projection plane to form a composite motion vector to project to the at least one image to form the projection motion vector; wherein the projection plane is at or parallel to a camera plane formed by the optical axes associated with the camera positions of the at least two images and the at least one image; wherein the composite motion vector is a horizontal component projection of the source motion vectors; and the projection motion vector is formed by adding a vertical component of the source motion vectors to the horizontal component projection of the composite motion vector onto the at least one image. The method also comprising determining the length of the projection motion vector by determining the angle of the composite motion vector and optical axis of the camera position of the projection motion vector relative to a common axis associated with the projection plane; using the projection motion vector to reduce a search area for matching blocks of image data to determine a motion vector during motion estimation of the at least one image; at least one of: using the projection motion vector without using motion estimation to form a prediction during motion compensation; setting a prediction mode of a block of image data associated with the projection motion vector to inter-prediction regardless of the existence of other candidate prediction modes; and placing the projection motion vector in a bitstream of compressed image data to be transmitted to at least one decoder.

Another computer-implemented method of video decoding comprises receiving a bitstream of compressed image data comprising pixel data of multiple images of the same scene and captured from multiple different camera positions at different angles relative to the scene, and at least one projection motion vector formed, at an encoder, by: determining source motion vectors of images of at least two camera positions of the multiple camera positions and by using a prediction loop of a coder; and projecting the source motion vectors to form a projection motion vector on at least one image of the multiple camera positions to be used to encode the at least one image.

This method also may comprise wherein the at least one projection motion vector being formed by: projecting the source motion vectors to a projection plane to form a composite motion vector projected to the at least one image to form the projection motion vector; wherein the projection plane is at or parallel to a camera plane formed by the optical axes associated with the camera positions of the at least two image and at least one image; wherein the composite motion vector is a horizontal component projection of the source motion vectors; and the projection motion vector is formed by adding a vertical component of the source motion vectors to the horizontal component projection of the composite motion vector onto the at least one image. The method comprising: determining the length of the projection motion vector by determining the angle of the composite motion vector and optical axis of the camera position relative to a common axis associated with the projection plane; and at least one of using the projection motion vector to reduce a search area for matching blocks of image data to determine a motion vector during motion estimation of the at least one image; using the projection motion vector directly to form a prediction during motion compensation, and setting a prediction mode of a block of image data associated with the projection motion vector to inter-prediction regardless of the existence of other candidate prediction modes.

A computer-implemented system comprises at least one display; at least one memory to store frames of video sequences of pixel data of multiple images of the same scene and captured from multiple different camera positions at different angles relative to the scene; at least one processor communicatively coupled to the at least one of the memory and display; an encoder with a prediction loop to determine source motion vectors of images of at least two camera positions of the multiple camera positions; and a multi-perspective motion vector projection unit operated by the at least one processor and operated by projecting the source motion vectors to form a projection motion vector on at least one image of the multiple camera positions to be used to encode the at least one image.

The system further may comprise wherein the encoder is arranged to operate by coding two video sequences of two camera positions received by the encoder to form the source motion vectors, and the projection unit is arranged to project the source motion vectors to at least one target image of at least one of the remaining video sequences of the multiple camera positions. The system includes wherein the projection unit is arranged to operate by projecting the source motion vectors to a projection plane to form a composite motion vector to project to the at least one image to form the projection motion vector; wherein the projection unit is arranged to operate by determining the length of the projection motion vector depending on the length of the composite motion vector, and both the angle of the composite motion vector and optical axis of the camera position of the projection motion vector relative to a common axis associated with the projection plane. The system also includes wherein the encoder is arranged to operate by at least one of:

using the projection motion vector to reduce a search area for matching blocks of image data to determine a motion vector during motion estimation of the at least one image, and using the projection motion vector without using motion estimation to form a prediction during motion compensation; wherein the encoder comprises an over-ride mode comprising selecting a prediction mode that is associated with a projection motion vector whether or not other non-projection prediction candidates are present for selection for the same image data on a target image being analyzed; wherein the encoder is arranged to operate by both using the projection motion vector to reduce a search area for matching blocks of image data to determine a motion vector during motion estimation of the at least one image, and using the projection motion vector without motion estimation during motion compensation to form two competing candidate predictions from motion compensation.

A computer readable medium having stored thereon instructions that when executed cause a computing device to operate by: receiving pixel data of multiple images of the same scene and captured from multiple different camera positions at different angles relative to the scene; determining source motion vectors of images of at least two camera positions of the multiple camera positions and by using a prediction loop of a coder; and projecting the source motion vectors to form a projection motion vector on at least one image of the multiple camera positions to be used to encode the at least one image.

The instructions also may cause the computing device to operate by wherein the instructions cause the computing device to operate by: projecting the source motion vectors to a projection plane to form a composite motion vector projected to the at least one image to form the projection motion vector; wherein the projection plane is at or parallel to a camera plane formed by the optical axes associated with the camera positions of the at least two image and at least one image; wherein the composite motion vector is a horizontal component projection of the source motion vectors; and the projection motion vector is formed by adding a vertical component of the source motion vectors to the horizontal component projection of the composite motion vector onto the at least one image; the instructions cause the computing device to operate by: determining the length of the projection motion vector by determining the angle of the composite motion vector and optical axis of the camera position relative to a common axis associated with the projection plane; and at least one of: using the projection motion vector to reduce a search area for matching blocks of image data to determine a motion vector during motion estimation of the at least one image; using the projection motion vector directly to form a prediction during motion compensation, and setting a prediction mode of a block of image data associated with the projection motion vector to inter-prediction regardless of the existence of other candidate prediction modes.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A computer-implemented method of video coding comprising:
   receiving pixel data of multiple images of the same scene and captured from multiple different camera positions at different angles relative to the scene;
   determining source motion vectors of images of at least two camera positions of the multiple camera positions and by using a prediction loop of a coder;
   projecting the source motion vectors of the at least two camera positions to a projection plane by using projection lines and without the use of one or more depth maps,
   wherein the projection plane is in a three dimensional space formed between the images of the at least two camera positions, wherein the projection plane is not any of the images, and
   wherein the projections of the source motion vectors cooperatively form a composite motion vector at the projection plane and formed of horizontal components of a three-dimensional representation of the source motion vectors in the three-dimensional space; and
   projecting the composite motion vector to at least one image of the multiple camera positions to form a projection motion vector on at least one image of the multiple camera positions to be used to encode the at least one image.

2. The method of claim 1 wherein the optical axes associated with the camera positions used to form the at least two and at least one images are in the same camera plane.

3. The method of claim 1 wherein the projection plane is at or parallel to a camera plane formed by the optical axes associated with the camera positions of the at least two images and the at least one image.

4. The method of claim 1 wherein the composite motion vector is a horizontal component projection of the source motion vectors; and the projection motion vector is formed by adding a vertical component of the source motion vectors to the horizontal component projection of the composite motion vector onto the at least one image.

5. The method of claim 1 comprising determining the length of the projection motion vector by determining the angle of the composite motion vector and optical axis of the camera position of the projection motion vector relative to a common axis associated with the projection plane.

6. The method of claim 1 comprising using the projection motion vector to reduce a search area for matching blocks of image data to determine a motion vector during motion estimation of the at least one image.

7. The method of claim 1 comprising using the projection motion vector without using motion estimation to form a prediction during motion compensation.

8. The method of claim 1 comprising setting a prediction mode of a block of image data associated with the projection motion vector to inter-prediction regardless of the existence of other candidate prediction modes.

9. The method of claim 1 comprising placing the projection motion vector in a bitstream of compressed image data to be transmitted to at least one decoder.

10. The method of claim 1
    wherein the projection plane is at or parallel to a camera plane formed by the optical axes associated with the camera positions of the at least two image and at least one image;
    wherein the composite motion vector is a horizontal projection of the source motion vectors; and the projection motion vector is formed by adding a vertical component of the source motion vectors to a projection of the composite motion vector onto the at least one image;

the method comprising:
determining the length of the projection motion vector by determining the angle of the composite motion vector and optical axis of the camera position relative to a common axis associated with the projection plane; and at least one of:
using the projection motion vector to reduce a search area for matching blocks of image data to determine a motion vector during motion estimation of the at least one image;
using the projection motion vector without using motion estimation directly to form a prediction during motion compensation, and
setting a prediction mode of a block of image data associated with the projection motion vector to inter-prediction regardless of the existence of other candidate prediction modes.

11. A computer-implemented method of video decoding comprising:
receiving a bitstream of compressed image data comprising pixel data of multiple images of the same scene and captured from multiple different camera positions at different angles relative to the scene, and at least one projection motion vector formed, at an encoder, by:
determining source motion vectors of images of at least two camera positions of the multiple camera positions and by using a prediction loop of a coder;
projecting the source motion vectors of the at least two camera positions to a projection plane by using projection lines and without the use of one or more depth maps,
wherein the projection plane is in a three dimensional space formed between the images of the at least two camera positions, wherein the projection plane is not any of the images, and
wherein the projections of the source motion vectors cooperatively form a composite motion vector at the projection plane and formed of horizontal components of a three-dimensional representation of the source motion vectors in the three-dimensional space; and
projecting the composite motion vector to at least one image of the multiple camera positions to form a projection motion vector on at least one image of the multiple camera positions to be used to encode the at least one image.

12. The method of claim 11
wherein the projection plane is at or parallel to a camera plane formed by the optical axes associated with the camera positions of the at least two image and at least one image;
wherein the composite motion vector is a horizontal component projection of the source motion vectors; and
the projection motion vector is formed by adding a vertical component of the source motion vectors to the horizontal component projection of the composite motion vector onto the at least one image;
the method comprising:
determining the length of the projection motion vector by determining the angle of the composite motion vector and optical axis of the camera position relative to a common axis associated with the projection plane; and at least one of
using the projection motion vector to reduce a search area for matching blocks of image data to determine a motion vector during motion estimation of the at least one image;
using the projection motion vector directly to form a prediction during motion compensation, and
setting a prediction mode of a block of image data associated with the projection motion vector to inter-prediction regardless of the existence of other candidate prediction modes.

13. A computer-implemented system comprising:
at least one display;
at least one memory to store frames of video sequences of pixel data of multiple images of the same scene and captured from multiple different camera positions at different angles relative to the scene;
at least one processor communicatively coupled to the at least one of the memory and display;
an encoder with a prediction loop to determine source motion vectors of images of at least two camera positions of the multiple camera positions; and
a multi-perspective motion vector projection unit operated by the at least one processor and operated by:
projecting the source motion vectors of the at least two camera positions to a projection plane by using projection lines and without the use of one or more depth maps,
wherein the projection plane is in a three dimensional space formed between the images of the at least two camera positions, wherein the projection plane is not any of the images, and
wherein the projections of the source motion vectors cooperatively form a composite motion vector at the projection plane and formed of horizontal components of a three-dimensional representation of the source motion vectors in the three-dimensional space, and
projecting the composite motion vector to at least one image of the multiple camera positions to form a projection motion vector on at least one image of the multiple camera positions to be used to encode the at least one image.

14. The system of claim 13 wherein the encoder is arranged to operate by coding two video sequences of two camera positions received by the encoder to form the source motion vectors, and the projection unit is arranged to project the source motion vectors to at least one target image of at least one of the remaining video sequences of the multiple camera positions.

15. The system of claim 13 wherein the projection unit is arranged to operate by determining the length of the projection motion vector depending on the length of the composite motion vector, and both the angle of the composite motion vector and optical axis of the camera position of the projection motion vector relative to a common axis associated with the projection plane.

16. The system of claim 13 wherein the encoder is arranged to operate by at least one of:
using the projection motion vector to reduce a search area for matching blocks of image data to determine a motion vector during motion estimation of the at least one image, and
using the projection motion vector without using motion estimation to form a prediction during motion compensation.

17. The system of claim 13 wherein the encoder comprises an over-ride mode comprising selecting a prediction mode that is associated with a projection motion vector whether or not other non-projection prediction candidates are present for selection for the same image data on a target image being analyzed.

18. The system of claim 13 wherein the encoder is arranged to operate by both using the projection motion vector to reduce a search area for matching blocks of image data to determine a motion vector during motion estimation of the at least one image, and using the projection motion vector without motion estimation during motion compensation to form two competing candidate predictions from motion compensation.

19. The system of claim 13 wherein the encoder is arranged to operate by coding two video sequences of two camera positions received by the encoder to form the source motion vectors, and the projection unit is arranged to project the source motion vectors to at least one target image of at least one of the remaining video sequences of the multiple camera positions;
   wherein the projection unit is arranged to operate by determining the length of the projection motion vector depending on the length of the composite motion vector, and both the angle of the composite motion vector and optical axis of the camera position of the projection motion vector relative to a common axis associated with the projection plane;
   wherein the encoder is arranged to operate by at least one of:
      using the projection motion vector to reduce a search area for matching blocks of image data to determine a motion vector during motion estimation of the at least one image, and
      using the projection motion vector without using motion estimation to form a prediction during motion compensation.

20. A non-transitory computer-readable medium having stored thereon instructions that when executed cause a computing device to be operated by:
   receiving pixel data of multiple images of the same scene and captured from multiple different camera positions at different angles relative to the scene;
   determining source motion vectors of images of at least two camera positions of the multiple camera positions and by using a prediction loop of a coder;
   projecting the source motion vectors of the at least two camera positions to a projection plane that is other than one of the images and to cooperatively form a composite motion vector at the projection plane;
   projecting the composite motion vector to at least one image of the multiple camera positions to form a projection motion vector on at least one image of the multiple camera positions to be used to encode the at least one image;
   wherein the projection plane is at or parallel to a camera plane formed by the optical axes associated with the camera positions of the at least two image and at least one image;
   wherein the composite motion vector is a horizontal component projection of the source motion vectors; and the projection motion vector is formed by adding a vertical component of the source motion vectors to the horizontal component projection of the composite motion vector onto the at least one image; and
   determining the length of the projection motion vector by determining the angle of the composite motion vector and optical axis of the camera position relative to a common axis associated with the projection plane.

21. The computer-readable medium of claim 20 wherein
the instructions cause the computing device to operate by:
at least one of:
   using the projection motion vector to reduce a search area for matching blocks of image data to determine a motion vector during motion estimation of the at least one image;
   using the projection motion vector directly to form a prediction during motion compensation, and
   setting a prediction mode of a block of image data associated with the projection motion vector to inter-prediction regardless of the existence of other candidate prediction modes.

22. The method of claim 1 comprising at least one of:
performing 2D line projections of the source motion vectors along the source vector's own image to where the image meets the projection plane, and then along the projection plane when the projection plane is not located at the same vertical height of end points of the source motion vectors, and
performing 2D line projections of the source motion vectors from endpoints of the source vector and directly onto the projection plane when the projection plane is located at the same vertical height of end points of the source motion vectors.

23. The system of claim 11 comprising at least one of:
performing 2D line projections of the source motion vectors along the source vector's own image to where the image meets the projection plane, and then along the projection plane when the projection plane is not located at the same vertical height of end points of the source motion vectors, and
performing 2D line projections of the source motion vectors from endpoints of the source vector and directly onto the projection plane when the projection plane is located at the same vertical height of end points of the source motion vectors.

24. The method of claim 1 comprising determining whether two of the source motion vectors of the two different images indicate motion of the same image content depending on whether the projections of the respective start points or end points of the two source motion vectors are within a predetermined block size of each other in the three-dimensional space.

25. The method of claim 24 wherein the block size is the smallest block size used by the encoder.

* * * * *